(12) United States Patent
Salisbury et al.

(10) Patent No.: US 10,942,878 B1
(45) Date of Patent: Mar. 9, 2021

(54) CHUNKING FOR BURST READ TRANSACTIONS

(71) Applicant: Arm Limited, Cambridge (GB)

(72) Inventors: Sean James Salisbury, Appley Bridge (GB); Chiranjeev Acharya, Sheffield (GB); Eduard Vardanyan, Sheffield (GB); Premkishore Shivakumar, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/831,266

(22) Filed: Mar. 26, 2020

(51) Int. Cl.
*G06F 13/28* (2006.01)
*G06F 9/46* (2006.01)

(52) U.S. Cl.
CPC .............. *G06F 13/28* (2013.01); *G06F 9/466* (2013.01); *G06F 2213/0038* (2013.01)

(58) Field of Classification Search
CPC ................................ G06F 13/28; G06F 9/466
See application file for complete search history.

(56) References Cited

U.S. PATENT DOCUMENTS

| | | | | |
|---|---|---|---|---|
| 6,505,259 B1* | 1/2003 | Garcia | .................. | G06F 13/404 710/20 |
| 2003/0131174 A1* | 7/2003 | Heynemann | .......... | G06F 13/364 710/310 |
| 2003/0131175 A1* | 7/2003 | Heynemann | ........ | G06F 13/1621 710/310 |
| 2005/0226243 A1* | 10/2005 | Zhai | ...................... | H04L 49/103 370/389 |
| 2012/0290752 A1* | 11/2012 | Lim | ..................... | G06F 13/4022 710/110 |
| 2016/0006805 A1* | 1/2016 | Ulupinar | ............... | H04L 69/166 709/217 |
| 2016/0306566 A1* | 10/2016 | Lu | ......................... | G06F 3/0659 |
| 2020/0089634 A1* | 3/2020 | Jalal | ..................... | G06F 13/1673 |

OTHER PUBLICATIONS

AMBA® AXI and ACE, Protocol Specification, ARM IHI 0022G (ID073019), Jul. 30, 2019 Arm Limited, 7 pages.

* cited by examiner

*Primary Examiner* — Tim T Vo
*Assistant Examiner* — Phong H Dang
(74) *Attorney, Agent, or Firm* — Nixon & Vanderhye P.C.

(57) ABSTRACT

An on-chip interconnect comprises control circuitry which responds to a burst read request received at an initiating requester interface, to control issuing of at least one read request to at least one target completer device via at least one target completer interface. For a chunking enabled burst read transaction, the control circuitry supports returning the requested data items to the initiating requester device in a number of data transfers, with an order of the data items in the data transfers permitted to differ from a default order and each data transfer specifying chunk identifying information identifying which portion of the data items is represented by returned data for that data transfer. For a data transfer returned to the initiating requester device based on data returned from one of a second subset of completer interfaces, the control circuitry generates the chunk identifying information to be specified by the given data transfer.

20 Claims, 12 Drawing Sheets

ARADDR is 0x00
ARLEN is 4 beats
ARSIZE is 256 bits
ARBURST is INCR.
Burst is split at 64B, i.e. into 2 transactions ARADDR = 0x00 & ARADDR = 0x40

Data Returned from Completer 0, chunking supported

| Transfer | | | CHUNKNUM | CHUNKSTRB | RLAST |
|---|---|---|---|---|---|
| 1st | | 0x20 | 1 | 01 | 0 |
| 2nd | 0x10 | | 0 | 10 | 0 |
| 3rd | 0x30 | | 1 | 10 | 0 |
| 4th | | 0x00 | 0 | 01 | 1 |

Data Returned from Completer 1, chunking not supported

| Transfer | | | CHUNKNUM | CHUNKSTRB | RLAST |
|---|---|---|---|---|---|
| 1st | 0x50 | 0x40 | Invalid | Invalid | 0 |
| 2nd | 0x70 | 0x60 | Invalid | Invalid | 1 |

Reconstructed Chunking from Completer 1, CHUNKNUM in order, CHKSTRBs all set

| Transfer | | | CHUNKNUM | CHUNKSTRB | RLAST |
|---|---|---|---|---|---|
| 1st | 0x50 | 0x40 | 0 | 11 | 0 |
| 2nd | 0x70 | 0x60 | 1 | 11 | 1 |

Interleaved to Requester with recalculated chunk identifying information

| Transfer | | | CHUNKNUM | CHUNKSTRB | RLAST |
|---|---|---|---|---|---|
| 1st | | 0x20 | 1 | 01 | 0 |
| 2nd | 0x10 | | 0 | 10 | 0 |
| 3rd | 0x50 | 0x40 | 2 | 11 | 0 |
| 4th | 0x30 | | 1 | 10 | 0 |
| 5th | | 0x00 | 0 | 01 | 0-now suppressed as not last |
| 6th | 0x70 | 0x60 | 3 | 11 | 1 |

FIG. 10

CHUNKING FOR BURST READ TRANSACTIONS

BACKGROUND

Technical Field

The present technique relates to the field of integrated circuits.

Technical Background

An on-chip interconnect may be provided on an integrated circuit to handle communication between one or more requester devices and one or more completer devices, where requester devices can issue memory access requests to be serviced by completer devices. For example the requester devices could include processing elements such as a central processing unit (CPU) or graphics processing unit (GPU), as well as other master devices such as display controllers, network controllers etc. The completer devices could, for example, include memory controllers for controlling access to corresponding memory units, peripheral controllers for controlling access to peripheral devices, etc. Some devices could act as both a requester device and a completer device.

The interconnect may support burst read requests, where a requester device can use to request a burst data transfer of multiple data items in response to a single request issued by the requester device.

SUMMARY

At least some examples provide an on-chip interconnect comprising: at least one requester interface to communicate with at least one requester device; a plurality of completer interfaces to communicate with a plurality of completer devices; and control circuitry responsive to a burst read request received at an initiating requester interface from an initiating requester device requesting transfer of a plurality of data items, to control issuing of at least one read request to at least one target completer device via at least one target completer interface; in which: for a chunking enabled burst read transaction indicating that the initiating requester device permits the plurality of data items to be returned to the initiating requester device in a different order to a default order associated with the burst read transaction, the control circuitry is configured to support returning the plurality of data items to the initiating requester device in a plurality of data transfers, with an order of the data items in the plurality of data transfers permitted to differ from the default order and each of the plurality of data transfers specifying chunk identifying information identifying which portion of the plurality of data items is represented by returned data returned in that data transfer; and for a given data transfer returned to the initiating requester device, for which the returned data is received in a given read response received from a given target completer interface in response to one of the at least one read request: when the given target completer interface is one of a first subset of completer interfaces, the control circuitry is configured to obtain the chunk identifying information specified by the given data transfer based on completer-provided chunk identifying information provided in the given read response from the given target completer interface; and when the given target completer interface is one of a second subset of completer interfaces, the control circuitry is configured to generate the chunk identifying information to be specified by the given data transfer.

At least some examples provide an integrated circuit comprising the on-chip interconnect described above, the at least one requester device and the plurality of completer devices.

At least some examples provide a non-transitory storage medium storing an electronic design file representing a design of an on-chip interconnect as described above.

At least some examples provide a computer-implemented method of generating an electronic design file representing a design of an on-chip interconnect for providing data transfer between devices of an integrated circuit; the method comprising: in response to design specification data identifying properties of the devices to be connected by the on-chip interconnect, generating the electronic design file specifying that the on-chip interconnect comprises: at least one requester interface to communicate with at least one requester device; a plurality of completer interfaces to communicate with a plurality of completer devices; and control circuitry responsive to a burst read request received at an initiating requester interface from an initiating requester device requesting transfer of a plurality of data items, to control issuing of at least one read request to at least one target completer device via at least one target completer interface; in which: for a chunking enabled burst read transaction indicating that the initiating requester device permits the plurality of data items to be returned to the initiating requester device in a different order to a default order associated with the burst read transaction, the control circuitry is configured to support returning the plurality of data items to the initiating requester device in a plurality of data transfers, with an order of the data items in the plurality of data transfers permitted to differ from the default order and each of the plurality of data transfers specifying chunk identifying information identifying which portion of the plurality of data items is represented by returned data returned in that data transfer; and for a given data transfer returned to the initiating requester device, for which the returned data is received in a given read response received from a given target completer interface in response to one of the at least one read request: when the given target completer interface is one of a first subset of completer interfaces, the control circuitry is configured to obtain the chunk identifying information specified by the given data transfer based on completer-provided chunk identifying information provided in the given read response from the given target completer interface; and when the given target completer interface is one of a second subset of completer interfaces, the control circuitry is configured to generate the chunk identifying information to be specified by the given data transfer.

At least some examples provide a non-transitory storage medium storing a computer program for controlling a data processing apparatus to perform the method described above.

Further aspects, features and advantages of the present technique will be apparent from the following description of examples, which is to be read in conjunction with the accompanying drawings.

BRIEF DESCRIPTION OF THE DRAWINGS

FIG. 10 illustrates a worked example of reconstruction of chunk identifying information for a burst read transaction which is split by the interconnect into separate burst transactions sent to different completer devices;

DESCRIPTION OF EXAMPLES

Figure 1:
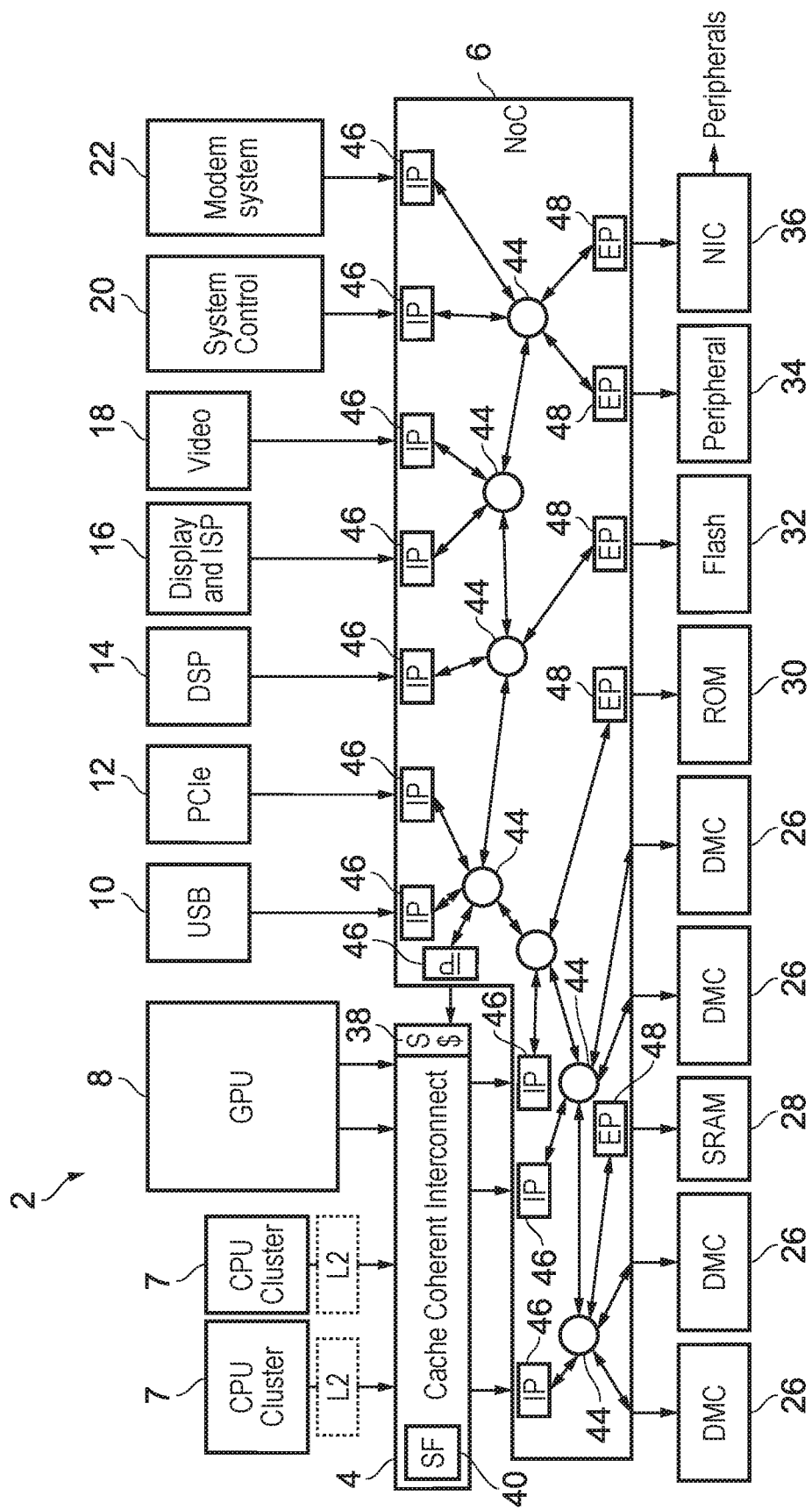
FIG. 1 shows an example of a data processing system including an on-chip interconnect.

An on-chip interconnect may have at least one requester interface to communicate with at least one requester device and two or more completer interfaces to communicate with respective completer devices. Control circuitry may respond to a burst read request received at an initiating requester interface from an initiating requester device requesting transfer of two or more data items, to control issuing of at least one read request to at least one target completer device via at least one target completer interface. The issuing of the at least one read request could be performed directly by the control circuitry, where the control circuitry generates the at least one read request according to the same protocol as used to encode the burst read request received from the initiating requesting device. Alternatively, in some embodiments the on-chip interconnect may use an internal network protocol which may differ from the protocol used by the interfaces to communicate with the requester or completer devices, and so in some cases the issuing of the at least one read request may be by issuing network packets to the at least one target completer interface, encoded according to the internal network protocol used by the on-chip interconnect, which can then be mapped by the at least one target completer interface to corresponding at least one read request to be issued to the at least one target completer device.

In general, a burst read request may be associated with a certain default order of the data items to be returned. For example the default order could be that the data items are to be returned in ascending address order, or in an order where the addresses extend from a midpoint address to the end of a sequence of addresses and then wrap around to the start of the sequence of addresses.

Some systems may constrain the handling of burst read transactions so that the data items of the bursts have to be returned in the default order. This may simplify handling of the received data items at the initiating requester device, as for example the initiating requester device may present the data items to the processing circuitry which requires the data in the same order as received, avoiding need for buffering or reordering at the initiating requester device. However, the data items may be obtained from memory storage or peripheral devices in a different order from the default order. If the data items have to be returned to the initiating requester interface in the default order then at some point within either the interconnect or the completer device it may be needed to buffer the data items as they are received from a downstream component, so that the data items can be reordered into the default order in which they are to be provided to the initiating requester device. Such buffering requires storage capacity to be implemented in hardware, incurring a power and circuit area cost, and also may incur additional delay in returning the data items as transfer of earlier obtained data items which occur later in the default order may have to wait until a later obtained data item which occurs earlier in the default order is ready.

It is recognised that some initiating requester devices may already have some internal buffer storage that can be used to locally buffer received data items prior to them being provided to the processing circuitry of that requester device, and in this case it may be more efficient for the data items of the burst read transaction to be returned to the initiating requester device in a different order from the default order, so that it is not necessary to incur the buffering costs at the completer device or an intermediate component such as the on-chip interconnect. This is particularly useful in cases where the interconnect responds to the burst read request from the initiating request during interface by initiating multiple read requests to more than one target completer interface, as in that case buffering the received data items may need to be performed at the point where the respective data items from the differing completer devices are combined into a stream to be sent to the initiating requester interface, and this buffering may duplicate buffer capacity already provided at the requester device.

Hence, some systems may support a technique referred to as data chunking where an initiating requester device may designate a certain burst read transaction as a chunking enabled burst read transaction, to signal that that requester device permits the data items of the burst to be returned to it in a different order to the default order associated with the burst read transaction. If the burst read transaction is marked by the initiating requester device as chunking enabled, then the control circuitry of the interconnect can support returning the data items to the initiating requester device in multiple data transfers where an order of the data items in the data transfers is permitted to differ from the default order. When chunking is enabled, the control circuitry may control the initiating requester interface to return the data items in the data transfers to the initiating requester device, where each data transfer specifies chunk identifying information identifying which portion of the data items is represented by the return data in that data transfer. The initiating requester device can use that chunk identifying information to reorder the data so that it can reconstruct the required default order of the data as appropriate.

However, one problem arising in systems supporting data chunking is that not all completer devices may be able to support the chunking, as some completer devices may not be able to provide the chunk identifying information which identifies which portion of the data items is represented by a particular item of return data.

One approach to dealing with this problem could be that at the point when the chunking enabled burst read transaction is received at the initiating requester interface, the control circuitry could look up capability information identifying the capabilities of the respective completer devices (or completer interfaces) to which the corresponding read requests are to be sent, and determine based on that information whether those interfaces or completer devices support data chunking. If all the completer devices support chunking, then chunking could be enabled for the subsequent read requests, but if any completer device does not support chunking then chunking may not be used for any of the requests sent to any of the completer devices. Instead, the completer devices would be constrained to return the data items in the default order and then the interconnect would itself return the data items to the initiating requester device in the default order. With this approach, the chunking may permit the data items to be returned to the initiating requester device in the order different to the default order only if all of the completer devices accessed to obtain the data items support chunking.

However, this approach has several problems. One issue is that this may greatly reduce the likelihood that chunking can actually be used for processing a given burst read request, and so the interconnect may need to include additional buffer capacity to deal with the increased likelihood that data items returned in response to burst read transactions will need to be buffered for the purpose of reordering into the default order at the interconnect. This may increase the area and power cost of the interconnect.

Also, a problem with looking up the capabilities of particular completer devices or completer interfaces at the point when a request has been received from the requester device is that this lookup increases the delay associated with processing the received request. At the point that the request is received there may already be a number of other lookups that need to be performed, such as mapping the address of the request onto the particular completer interfaces to which requests are to be routed, or performing other checks for enforcing memory ordering requirements or maintaining coherency for example. Hence, adding an additional check to determine the capabilities of the target completer interface (which by definition may need to be performed after the address lookup for identifying the target completer interface) may add additional latency on the critical timing path for processing read transactions, which may be undesirable.

With the approach discussed below, the interconnect is given the capability of reconstructing chunk identifying information provided by a completer interface which has not itself been able to provide that chunk identifying information. For other completer interfaces the chunk identifying information may be provided in the read response received from that computer interface. Hence, even if a burst read transaction causes read requests to be sent to multiple completer devices, some of which support chunking and some of which do not, then it is possible for the interconnect to use the completer-provided chunk identifying information provided by those target completer interfaces which do support chunking and for other target completer interfaces which do not support chunking the chunk identifying information can be reconstructed at the interconnect, so that it is still possible to use the chunking approach for the data items returned to the initiating requester device and so this avoids the need for extra buffering at the interconnect. While some buffer capacity may still be provided at the interconnect to deal with cases where a requester device specifies that chunking is disabled, the total amount of buffer space needed can be less if it is not necessary to use some of the buffer space for dealing with chunking enabled transactions which target a mix of completer interfaces with different capabilities. Also, this approach of reconstructing the chunk identifying information at the time of receiving a read response form a completer device means it is not necessary to lookup chunking capabilities of individual completer devices at the time of processing the read request from the initiating requester device, which can reduce the latency associated with the critical timing path involved in processing the request received from the initiating requester device.

Hence, for a given data transfer returned to the initiating requester device, for which the returned data in that data transfer is received in a given read response received from a given target completer interface in response to one of the read requests sent out by the interconnect, when the given target completer interface is one of a first subset of completer interfaces then the chunk identifying information for the given data transfer may be obtained based on the completer-provided chunk identifying information provided in the given read response from the given target completer interface. When the given target completer interface is one of a second subset of completer interfaces, the control circuitry may itself generate the chunk identifying information to be specified by the given data transfer. This recognises that as the data items for responses which do not specify chunk identifying information would be provided in the default order then it is possible to reconstruct the chunk identifying information at the interconnect. When chunk identifying information is reconstructed by the control circuitry in the interconnect, the chunk identifying information that is passed back to the initiating requester device with a given data transfer includes at least some information which is different from any information specified in the read response received at the given target completer interface from the corresponding target completer device.

The first and second subsets of completer interfaces could be non-overlapping subsets of completer interfaces, so that each completer interface could be considered either to be a chunking-supporting interface which supports the provision of completer-provided chunk identifying information, or a non-chunking supporting interface which does not provide completer-provided chunk identifying information and for which the chunk identifying information can instead be reconstructed by reconstruction circuitry within the control circuitry of the interconnect.

However, in other examples there may be a partial overlap between the first and second subsets of completer interfaces, so that at least one completer interface could be part of both the first and second subsets, in the sense that while it does provide some completer-provided chunk identifying information, the chunk identifying information from that completer interface may still be remapped or changed in some way at the interconnect to reconstruct the chunk identifying information to be provided to the initiating requester device for the corresponding data transfer. For example, if the completer interface is associated with a different channel data width to the data width associated with the channel used to communicate between the initiating requester device and the initiating requester interface then it may be useful for the interconnect to be able to map the chunk identifying information specified by the target completer device to different chunk identifying information provided to the initiating requester device. Also, if responses are received from more than one completer device supporting chunking, the chunk identifying information from one of those completer devices may be remapped to fit with chunk identifying information generated by another of the completer devices, e.g. as each completer device may have generated chunk identifying information for its own portion of the data items to be transferred which could include duplicate chunk identifiers and so it may be useful to map this to a set of chunk identifying information which identifies the position of each portion of data item transferred within the overall sequence of data items to be returned to the initiating requester device. Hence, some completer interfaces may be considered to be both part of the first subset and the second subset. However there may be at least one completer interface which is only part of the second subset as it is not able to support chunking.

The control circuitry may be a single instance of control logic within the interconnect, or could include distributed instances of control logic disposed at different points of the interconnect. For example, the control circuitry could include circuit logic within the requester interfaces and completer interfaces.

The reconstruction of the chunk identifying information could be performed at any part of the control circuitry, e.g. within the requester interface, within the completer interface or within an intermediate component in the interconnect.

The control circuitry may determine whether a given target completer interface is one of the first subset or the second subset based on information obtained at the given target completer interface. If this determination is made by the given target completer interface, the reconstruction of the chunk identifying information for a completer not supporting chunking could also take place at the given target completer interface (some remapping of chunk identifying information from multiple different completers may still be performed at the initiating requester interface in this case). Alternatively, the information obtained at the given target completer interface could be transmitted to the initiating requester interface along with the read response, and then the reconstruction of the chunk identifying information for non-chunking-supporting completers could take place at the initiating requester interface. Either way, as whether a given completer interface is in the first or second subset can be determined based on information provided by the given target completer interface, this means it is not necessary to look up information about the capabilities of the target completer interface at the time of processing the read request received from the initiating requester device, so as to reduce the latency of the critical path in processing that read request as discussed above.

The information provided by the completer interface, which is used to determine whether the given target completer interface is in the first subset or the second subset, may comprise at least one of: chunk identifying information validity information indicating whether valid completer-provided chunk identifying information is provided in the given read response; chunking capability information indicating whether the given target completer interface or a completer device corresponding to the given target completer interface is capable of providing completer-provided chunk identifying information; and size information indicating a channel data size associated with the given target completer interface.

For example, a target completer interface for which the chunk identifying information validity information received from the corresponding completer device indicates that there is no valid completer-provided chunk identifying information could be treated as an interface in the second subset so that the chunk identifying information is reconstructed. If provided, the chunking capability information can be used to determine whether the read response will contain chunk identifying information or not and hence whether the interface is in the first or second subset. The size information indicating the channel data size for the given target completer interface can be used to determine the particular way in which the chunk identifying information is to be reconstructed, which may vary depending on the size. For example, if the channel data size associated with the target completer interface is narrower than a data size associated with the communication channel between the initiating requester device and the initiating requester interface, then the size information could be used to set strobe information which indicates which portions of a data item transmitted on the channel to the initiating requester device are active in a given data transfer (as discussed in more detail below).

In some cases the information used to determine which subset the given target completer interface belongs to could be provided by the target completer device itself (e.g. in the case of the chunk identifying information or the chunking capability information). However, in other cases the information used to determine which subsets the interface belongs to could be obtained at the target completer interface, separate from any information received from the target completer device. For example, the capability or size information could be looked up from storage circuitry within the completer interface itself. The latency of looking up storage at the completer interface may be less critical than latency incurred at the requesting interface, as it does not delay issuing of read requests and this lookup latency may be hidden by the latency of returning data from memory associated with other data items returned for the same burst. Also, at the completer interface the storage only needs to store the capability/size information for a single completer, rather than implementing a lookup table looked up based on the address of the request, which can be faster to read than the lookup table which would be needed at the requester interface to track information for a number of different completer interfaces.

The chunking capability information and/or size information could be appended by the given target completer interface to any information received from the target completer device, and then returned to the control circuitry of the interconnect, for example within network packets associated with the protocol used for network communication within the interconnect (which as discussed above may differ from the protocol used to communicate between the completer interface and the corresponding completer device).

The chunk identifying information can take different forms. In one example the chunk identifying information may comprise a chunk ordering identifier which indicates a position of a data item represented by the returned data relative to the default order of the data items.

For example the chunk ordering identifier could be a count value or "chunk number" which identifies the position within the default order.

In some examples, the chunk ordering identifier could be the only item of chunk identifying information.

However, other examples may also provide, as part of the chunk identifying information, strobe information which indicates which sub-portions of the data item are represented by the returned data for a given data transfer. This can be useful for dealing with cases where a downstream component uses a communication channel with a narrower data width than an upstream component and so when data is returned to the requesting device then the returned data item may not fill the entire data width of the communication channel and so the strobe information can be used to indicate which sub-portions of the data item are represented by the returned data.

In some examples, when the given target completer interface is one of the second subsets of completer interfaces, the control circuitry may generate the chunk identifying information based on size information indicating a channel data size associated with the given target completer interface. For example this channel data size could indicate the width of the portion of the communication channel used for read data between the given target completer interface and the corresponding target completer device. This size information could be provided by the interface based on information read from storage circuitry within the given target completer interface.

When a channel data size for a communication channel associated with the given target completer interface is different from a channel data size for a communication channel associated with the initiating requester interface, the control circuitry may generate the strobe information based on size information obtained at the given target completer interface, the size information indicating a channel data size associated with the given target completer interface.

The reconstruction of the chunk identifying information may be based on the assumption that read responses received for a case where there is no valid completer-provided chunk identifying information are received in the default order. Hence, when two or more read responses are received from the given target completer interface in response to the at least one read request, the given target completer interface is one of the second subset of completer interfaces and the plurality of read responses do not specify valid completer-provided chunk identifying information, the control circuitry is configured to generate the chunk identifying information for the data transfers associated with the plurality of read responses to indicate that the data items are provided in the default order. For example, the control circuitry could have a counter which is incremented each time one of the read responses corresponding to the burst read request is received, with chunk ordering identifiers for each successive data transfer allocated based on the current value of the counter.

Also, in some cases even when there is valid completer-provided chunk identifying information returned from a completer interface, there could be remapping of the chunk identifying information based on the size information described earlier. Hence, when the given target completer interface is one of the second subset of completer interfaces and the given read response specifies valid completer-provided chunk identifying information, the control circuitry may remap the valid completer-provided chunk identifying information based on size information indicating a channel data size associated with the given target completer interface, to generate the chunk identifying information for a corresponding data transfer. For example, a completer device using a narrower read data width may return chunk ordering information indicating that two transfers return different data items, but on the corresponding data transfer to the initiating requester device using a wider read data width, this data may actually correspond to different portions of the same data item at the wider data width. Therefore, based on the size information, two different values of chunk ordering information for the respective read responses received from the completer could be mapped to chunk ordering information having the same value to be returned to the requester (with strobe information distinguishing the different portions of the same data item in the data transfers returned to the requester).

In one example, in response to the chunking enabled burst read request, the control circuitry may control the at least one read request to be issued via the at least one target completer interface, with each read request issued as a chunking enabled read request indicating that the data items are permitted to be returned in a different order to the default order, regardless of whether that read request is issued to a target completer interface in the first subset or a target completer interface in the second subset. The control circuitry could control the issuing of such chunking enabled read requests without looking up whether the at least one target completer interface is in the first subset or the second subset. Hence, the control circuitry of the interconnect may itself mark read requests sent downstream as chunking enabled if the burst read request from the initiating requesting device is designated as chunking enabled. For example, a chunking enable indication may be sent with each request to signal whether it is a chunking enabled read request or a chunking disabled read request. By designating all of the read requests issued in response to a chunking enabled burst read request as chunking enabled regardless of which target completer interface the request is issued to, this means its not necessary to lookup capabilities of each interface at the point of receiving the chunking enabled burst read request from the initiating requester, to reduce the critical path latency. Although the chunking enabled burst read request may trigger chunking enabled read requests to be sent to each completer device, this does not necessarily mean that each of those target completer devices are able to support data chunking and so some of them may not be able to return valid completer-provided chunking identifying information. Note that the completer devices which do not return valid chunk identifying information could in some cases be connected to the completer interface by a communication channel which has no signal path at all for conveying the chunk identifying information, or alternatively there could be such a signal path provided on the channel, but it may not be used as the response from the non-chunking-supporting target completer device may indicate that the information on the chunk identifying information signal paths is invalid.

Although the technique of reconstructing chunk identifying information at the interconnect described above can be useful for a range of interconnects, it can be particularly useful for interconnects which support one or more of the following:

Burst splitting, where the chunking enabled burst read transaction may be split into read requests sent to multiple different target completer interfaces. That is, a burst read request requesting transfer of a certain number of data items may be split into multiple separate burst read requests each requesting transfer of a subset of the data items requested by the burst read request received at the initiating requester interface. By using the reconstruction feature described above it becomes feasible to use data chunking even for bursts split across multiple target completer interfaces where not all of those completer interfaces support chunking. Hence, the control circuitry is configured to support providing the data transfers specifying the chunk identifying information to the initiating requester interface, for a chunking enabled burst read transaction for which a plurality of read requests are to be sent to a plurality of different target completer interfaces including at least one target completer interface capable of providing completer-provided chunk identifying information and at least one target completer interface for which provision of completer-provided chunk identifying information is disabled or unsupported.

completer interfaces associated with different channel data sizes. Without the reconstruction discussed above, it may be difficult to fit chunking information sent from completer interfaces with different channel data sizes together when forming the chunking information to be provided to the initiating requesting device. By providing the reconstruction capability discussed above then it becomes feasible to use chunking even for data transfers involving multiple completers associated with different channel data sizes. Hence, the control circuitry is configured to support providing the data transfers specifying the chunk identifying information to the initiating requester interface, for a chunking enabled burst read transaction for which a plurality of read requests are to be sent to a plurality of different target completer interfaces including target completer interfaces associated with different channel data sizes.

Address striping, where the mapping of physical addresses onto particular regions of memory storage accessed through the completer interfaces may be such that, for at least a portion of the memory address space, segments of physical addresses are mapped alternately to the respective completer interfaces so that a given completer interface is mapped to a number of discontiguous segments of physical addresses. Address striping can be useful for performance because it is common that a number of successive memory access requests may target nearby physical addresses, and so by striping these across different completer interfaces this makes it more likely that these requests can be handled in parallel rather than having to have a single completer interface serialising a number of successive requests. However, when address striping is supported then it is likely that a burst transaction could require servicing by multiple different completer devices, making it more likely that there is a mix of capabilities with some completers supporting chunking and others not. Again, the techniques discussed above can make it more likely that chunking can be used for the burst transaction as a whole when returned to the initiating requesting device, without an expensive lookup of completer capabilities at the interconnect when receiving a read request.

An integrated circuit may comprise the on-chip interconnect having the features discussed above, as well as comprising the requester device and completer devices themselves.

The design of the interconnect described above could be represented in electronic form within an electronic design file stored on a storage medium. The storage medium may be a non-transitory storage medium.

In some examples, it is possible for the design of the on-chip interconnect for such an integrated circuit to be designed electronically using a computer-implemented method which generates an electronic design file representing the design of the on-chip interconnect. The method may include receiving design specification data which identifies properties of the devices to be connected by the on-chip interconnect. For example these devices could include processing units such as a central processing unit (CPU) or graphics processing units (GPU), and memory devices such as memory controllers, on chip storage and peripheral controllers for controlling access to peripheral devices. The design specification data could for example specify the data sizes to be used by respective devices and information about the expected level of network traffic and then the computer implemented method may use that design specification data to select properties of the on-chip interconnect such as selecting which components to include within the interconnect and to select parameters for those components such as transmission channel widths, number of parallel transmission channels provided, etc. Hence, an electronic design file may be generated which specifies data characterising the design of the on-chip interconnect, which is generated in dependence on the design specification data. This electronic design file could represent the on-chip interconnect at different levels of generality. In some cases the design file may simply record some design parameters but need not provide a component-by-component representation of the on-chip interconnect. Alternatively the electronic design file may include a representation of each component to be included within the interconnect at a functional level, but need not specify the low-level transistor layout for the interconnect, which could be provided at a later stage of design. Alternatively the electronic design file may specify the design at a lower level such as specifying the individual transistor layouts or other aspects of the design for controlling integrated circuit manufacture.

Whatever the form of the electronic design file generated, the design file may include a specification that the on-chip interconnect comprises requester/completer interfaces and control circuitry as described above.

When a configurable design for the interconnect is generated electronically using the computer implemented method described above, then the information used for generating the chunk identifying information at the control circuitry, such as the size information on the size of the channel at the target completer interface, may be embedded within the electronic design file, for example by defining that the on-chip interconnect comprises storage circuitry to store reconstruction information which is to be obtained for a read response received at the second subset of completer interfaces. For example, based on the design specification data the program generating the electronic design may, based on the size of data channels it has configured, set the reconstruction information to be stored at the completer interface. Hence, when the interconnect is subsequently manufactured, when a given read response is received the control circuitry can use that information to reconstruct the chunk identifying information for read responses which do not themselves have valid completer-provided chunk identifying information.

A computer program for controlling a data processing apparatus from the electronic design generating method described above can be stored on a storage medium, which can be a no-transitory storage medium.

FIG. 1 schematically illustrates an example of a data processing system 2 (e.g. an integrated circuit or system-on-chip) having at least one on-chip interconnect 4, 6 for routing data access requests between requesting devices and completer devices and routing the responses to such data access requests from the completer devices to the requester devices.

Requester devices (also known as master devices) are devices capable of initiating memory access requests. In this example, the system 2 includes a number of requester devices, such as: one or more central processing units (CPUs) 7 or clusters of CPUs; a graphics processing unit (GPU) 8; a USB controller 10 for controlling interaction with devices over a universal serial bus (USB); a PCIe controller 12 for controlling interaction with devices connected to the system 2 over a PCI Express bus; a digital signal processor (DSP) 14; a display controller and/or image signal processor 16; a video controller 18; a system controller 20, which could provide a number of system control functions such as controlling direct memory access operations, controlling security operations such as encryption or other on chip security operations, or controlling interaction with peripherals; and a modem system controller 22 for controlling communications via a modem. All of the masters 7 to 22 may be capable of acting as a requesting device for issuing data access requests to be serviced by a completer device of the system.

Completer devices (also known as slave devices) are devices capable of servicing memory access requests. The system may have a number of components which may act as completer devices, for example including a number of memory controllers 26 for controlling access to dynamic random access memory (DRAM); a memory controller 28 for controlling access to static random access memory (SRAM); a memory controller 30 for controlling access to a read only memory (ROM); a flash memory controller 32 for controlling access to flash memory; a peripheral controller 34 for controlling access to peripheral devices; and a network interface controller 36 for controlling interaction with remote devices or further peripherals via a network interface. Also the completer devices may include a system cache 38 within the interconnect 4, 6, which can cache some data from the memory system 26-36 so that some data access requests can be serviced without needing to pass them on to a downstream memory component.

In the example of FIG. 1, some of the requester devices 7, 8 are coupled via a cache coherent interconnect 4 which is responsible for managing coherency between cached data held by the respective requesters' caches. The cache coherent interconnect 4 may have a snoop filter 40 for tracking data cached in particular requesters' caches and may respond to read and write data access requests specifying a target address by issuing snoop transactions to check for the coherency status of data associated with the target address cached in other requesters, so that if one requester requests read or write access to data, then data for the same address in another requester's cache can be invalidated, or if dirty, the latest value in that other requester's cache can be provided to the initiating and/or written back to the memory system. Any known coherency protocol could be used for the cache coherent interconnect 4.

The other requesters 10 to 22 (which may not comprise a cache) do not need to be connected via the cache coherent interconnect 4. A system interconnect 6 couples the outputs of the cache coherent interconnect 4 and the non-cached requesters 10 to 22 with the respective completer devices 26 to 36. The system interconnect 6 is used for routing of transactions to a target completer selected based on the target address specified by the request, and for routing of the responses back to the initiating requester. In the arrangement shown in FIG. 1, the system interconnect 6 does not need to take responsibility for management of coherency between cache data in respective requesters. However, in other examples, instead of providing a separate cache coherent interconnect 4 and system interconnect 6 as shown in FIG. 1, a single interconnect similar to the system interconnect 6 could be provided which connects each of the requester and completer devices and also manages cache coherency.

In this example, the system interconnect 6 is implemented as a network on chip (NoC) which comprises a number of routers 44 for coupling a number of requester interfaces 46 (from which data access requests, including read and write requests, can be received from respective requester devices 7-22) to a number of completer interfaces 48 (for outputting the requests to respective destination devices 26-36). Each requester interface 46 (also known as an ingress port, IP, or source endpoint) is responsible for decoding the address specified by the data access request to identify the particular route to be taken through the network on chip 6 via the routers 44 to reach a completer interface 48 associated with the selected completer device which is to service the data access request. In some cases the requester interface 46 may also translate the protocol used for the request asserted to the network on chip 6 into an internal representation to be used for routing the request across the network on chip 6. If the requests are translated into an internal protocol, then the completer interfaces 48 (also known as egress ports, EP, or destination endpoints) may translate them back into the original protocol used by the request for servicing by the completer device. Alternatively, some of the completer devices may handle the request directly in the form used by the network on chip 6 so that no translation would be needed at the completer interface. For each completer interface 48, when it receives the response to a data access request from the completer device 26-36, the completer interface 48 issues that response back along the path taken by the corresponding request to the requester interface 46 which issued the request, and the requester interface 46 then returns the response to the initiating requester.

A network on chip 6 as shown in FIG. 1 can be useful when there are a large number of requester and completer devices to be connected, as the arrangement of routers 44 can be designed bespoke for the requirements of a given system in order to provide for an appropriate level of bandwidth and to provide sufficient number of routers that the physical distance over which requests have to be routed on the chip can be accommodated without significant loss of signal amplitude. For pairs of requester and completer devices which are expected to require a large amount of traffic then additional routers 44 or signal channels can be provided between them, while other pairs of requester/completer devices may have less capacity.

The use of a network on chip is not essential and in other examples a different topology could be used within the system interconnect 6. For example, a series of point to point connections between the requester and completer interfaces could be used, or a ring topology may be used in which all requests are asserted onto a ring bus and then circulate round until they reach the required target interface. Also, a mesh topology could be used where each interface 46, 48 is connected to a point on a grid and requests and responses may traverse between the points on the grid associated with the corresponding requester and completer interfaces 46, 48. However, use of a network on chip can enable better scaling as the number of master and destinations increases.

Although FIG. 1 shows an example of a network for routing signals between master and slave devices within an integrated circuit, in other examples the devices connected by the interconnect may not have a master-slave relationship, but instead the devices could be connected by peer-to-peer connections. It is possible that some devices in the integrated circuit could be capable of functioning both as a requester and as a completer. Also, in some examples some requests routed by the network may target a completer device within the interconnect itself, such as points of coherency or caches, rather than targeting a completer device outside the interconnect. The particular set of requester/completer devices shown in FIG. 1 is just one example of a possible system architecture. Other examples may not have all of the types of requester/completer devices shown in FIG. 1, or could have other types of requester/completer device.

The NoC 6 may be a configurable NoC design which can comprise a number of components which can be combined in different layouts and arrangements depending on the particular arrangement of master devices and destination devices which are to be connected by the NoC 6. For example this may include any of the following components:

Requester interface (ingress port/source endpoint) 46. The requester interface 46 receives data access requests from a requesting device coupled to the ingress port. For example the requester interface 46 may act as one of the master interfaces 46 shown in FIG. 1. The requester interface 46 may decode a target address as specified by the data access request received from the requesting node to identify which completer interface(s) 48 should be selected for handling the request, and generates routing information for controlling the routing of the request across the NoC to the selected completer interface 48. Also, as requests routed within the NoC 6 may use a different protocol to the protocol used by the requesting nodes for the data access requests, the requester interface may include a protocol adapter for translating the request into the transport protocol used on the network. The requester interface 46 transmits the translated packets onto the network accompanied by routing information identifying how network packets corresponding to the request should be routed across the NoC. The requester interface 46 may also provide other functions such as managing resource allocation for particular requests, and controlling a quality of service level provided for requests from different sources so as to balance the competing needs of different master devices for bandwidth on the network. For example the requester interface 46 may have various buffers for buffering tracking information relating to requests and buffering responses to the requests. The requester interface 46 may control allocation of resource and issuing of requests based on availability of space in the buffers, and based on the quality of service requirements (e.g. providing a limit to the number of currently outstanding transactions that can be pending at a given time, or a limit to the number of transactions from a given requesting mode which are serviced within a given period).

Router 44. Each router 44 is responsible for routing packets received from one component of the NoC 6 and selecting which other component the packet should be directed to, based on the routing information specified by the packets which has been appended to the packet by the requester interface 46 at which the corresponding request originated. The particular arrangement and number of routers 44 that are provided may depend on the particular system requirements. For example, if requester and completer interfaces are separated by a large distance on the integrated circuit then more routers may be required to provide sufficient repetition of packets to maintain signal level when the packets reach their destination. Also the topology in which the routers are connected may be selected based on expected bandwidth requirements for particular pairs of interfaces 46, 48.

Completer Interface (Egress Port or Destination Endpoint) 48

The completer interface 48 receives the network packets representing data access requests that were generated by the requester interface 46 and routed across the NoC via the routers 44. The completer interface 48 has a protocol adapter for translating the transport protocol of the network packets back into the protocol used by the destination node to which the completer interface is connected. Some forms of request may not require a response from the completer device. However, for requests which do require a response (e.g. a read response, a write response or both), when a response to a data access request is received from the completer device which has serviced the data access request, the responses can be adapted for the transport protocol of the network by the protocol adapter in the completer interface 48 and then output onto the network by the completer interface 48. In some cases, the response packets may be routed back to the initiating requester interface 46 which received the original data access request which triggered those responses, e.g. along a corresponding path to the one taken by the data access request packets but in the reverse direction, or on a different path. In other cases, the response packets may be routed to a different requester as they may sometimes need to be provided to a different requesting node to the requesting device that issued the original request (e.g. due to a change in coherency state in the caches of the respective masters). Hence again the protocol adapter may append routing information specifying the route to be taken by the response packets. When these response packets are received at the requester interface 46, the protocol adapter in the requester interface converts them into the responses expected by the requesting devices and forwards them onto the requesting device.

Note that in some examples the functions of the requester/completer interfaces may also be handled at a network bridge component (at the boundary between two network portions), so that the network bridge may effectively act as both a requester interface and a completer interface for at least some purposes. For example, this could be used at boundaries of clock or voltage domains, in which case the domain crossing component could be seen as both the completer interface (with respect to a request received from upstream) and the requester interface (with respect to a corresponding request to be sent downstream).

Other examples of possible network components may include data resizers which may resize data values transmitted across the network when provided from one component to another, for example mapping a packet comprising one number of data sections to a packet with a different number of data sections. Also, the network could include some clock domain crossing components if the NoC 6 spans multiple clock domains, as well as other types of network components, for example for implementing error checking or other functions. It will be appreciated that not all of the components of the NoC are shown in FIG. 1.

Figure 2:
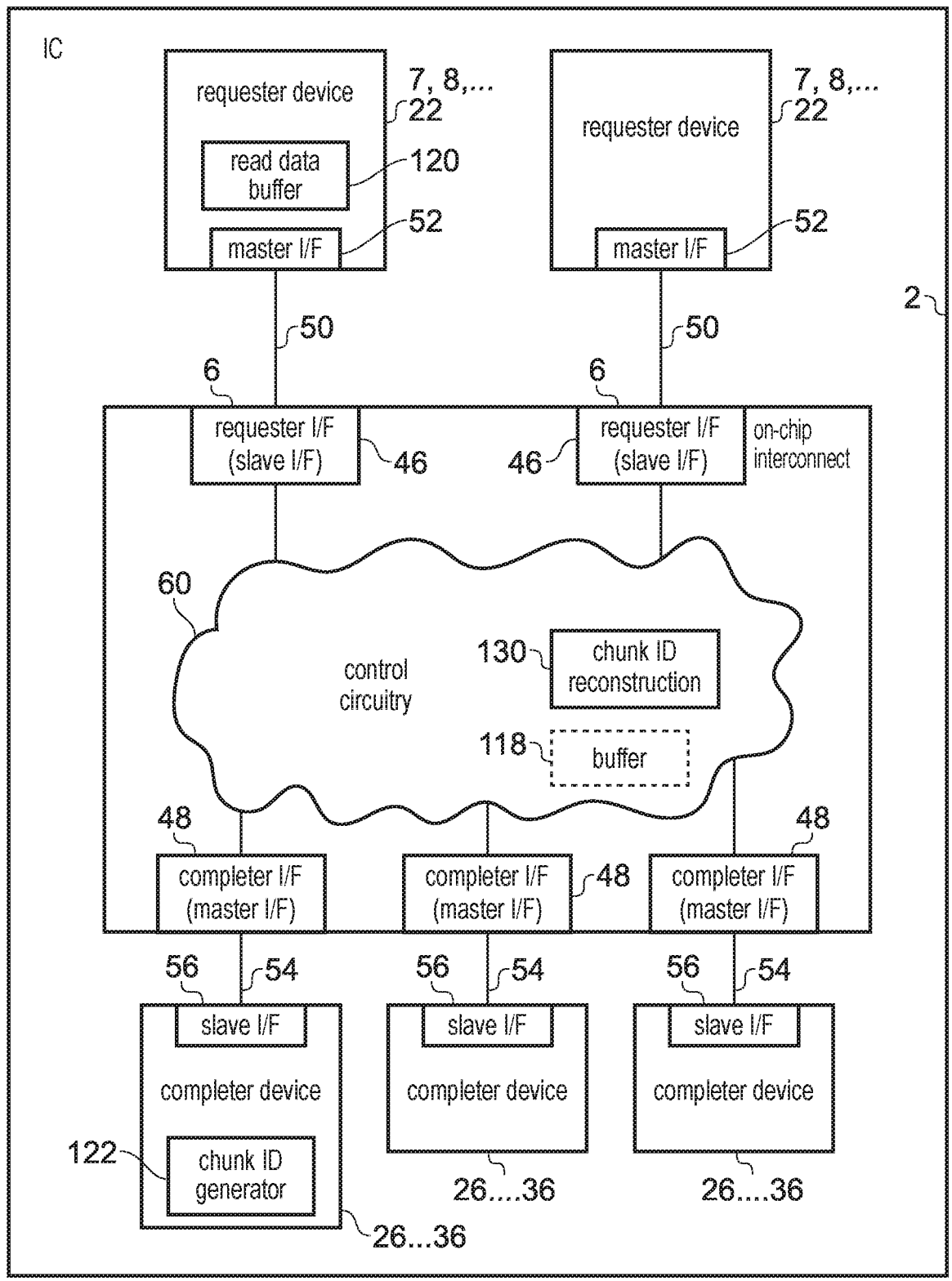
FIG. 2 illustrates components supporting data chunking in the on-chip interconnect.

FIG. 2 shows an example of some of the components of the system on chip or integrated circuit 2, which are involved in handling a feature called data chunking, which enables responses to a burst read transaction to be provided in a different order form a default order associated with the transaction. FIG. 2 shows the NoC 6 as an example of an on-chip interconnect which is used to communicate between a number of requester devices and a number of completer devices, where the requester devices are any of the devices 7-22 shown in FIG. 1 and the completer devices are any of the devices 26-36 shown in FIG. 1. Although the cache coherent interconnect 4 of FIG. 1 is not included in the example of FIG. 2, it could be provided in other examples.

Communication between a requester device 7-22 and a requester interface 46 of the interconnect 6 takes place over a communication channel 50 according to an on-chip interconnect protocol, such as the AMBA® AXI protocol developed by Arm® Limited of Cambridge, UK, for example. It will be appreciated that other on-chip communication protocols for a system on chip could be used. In general such a protocol defines a number of types of read or write transactions for accessing a memory system via the interconnect. The requester device 7-22 includes a master interface 52 which is responsible for asserting requests onto the communication channel 50 according to the protocol and the requester interface 46 of the interconnect 6 acts as a slave interface according to the on-chip communication protocol. Hence, the requester interface provides responses to the requester device 7-22 according to the requirements of the protocol.

Similarly, the communication channel 54 between the completer interfaces 48 of the interconnect 6 and corresponding completer devices 26-36 is performed according to the same on-chip communication protocol as used for the communications with the requester devices. On channels 54 the completer interface 48 within the interconnect 6 acts as a master interface according to the protocol and the completer devices have slave interfaces 56 which respond to the request issued by the completer interfaces 48 acting as masters.

As mentioned above, communications within the interconnect 6 may be encoded using a different protocol to the protocol used on the communication channels 50, 54, for example with an internal network protocol used within a network-on-chip provided as the interconnect 6. If a different network protocol is used then the requester and completer interfaces 46, 48 may include network packet encoders or decoders for converting between the bus protocol used on the transmission channels 50, 54 and the internal network protocol.

The interconnect 6 includes control circuitry 60 which controls aspects of routing of transactions within the interconnect 6. While the control circuitry 60 is shown as a single item of control logic in the example of FIG. 2, in other examples the control circuitry 60 could be distributed in functionality so that each of the requester interfaces 46 (and optionally at least some of the completer interfaces 48) may include a portion of the control circuitry 60. The control circuitry 60 may be responsible for determining, when a memory access request is received at a given requester interface 46, which completer interfaces 48 should be targeted by that request and may control issuing of a number of network packets across the interconnection network to the required target completer interfaces 48 where those network packets may then be converted into bus requests issued across the corresponding communication channels 54 to the relevant completer devices 26-36. Also, the control circuitry 60 may be responsible for handling other functions such as ensuring that memory ordering requirements are satisfied for controlling the handling of the responses received from respective completer devices and returning of corresponding responses to requester devices.

The control circuitry 60 may support burst splitting, where a burst transaction received from a requester device can be split into number of shorter bursts sent to different completer interfaces 48, and also may support address striping where a number of alternating segments of physical addresses are striped across different completers to improve performance by allowing requests to neighbouring segments of addresses to be handled in parallel. The size of each segment could be relatively small, e.g. of the order of a few bytes.

The communication channels 50, 54 need not be all of the same width and some channels may have a larger data width than others. Hence, the control circuitry 60 may also control resizing of packets sent across the interconnect 6 to adapt them for sending out over a completer transmission channel 54 which may have a different size from the corresponding requester transmission channel 50.

Figure 3:
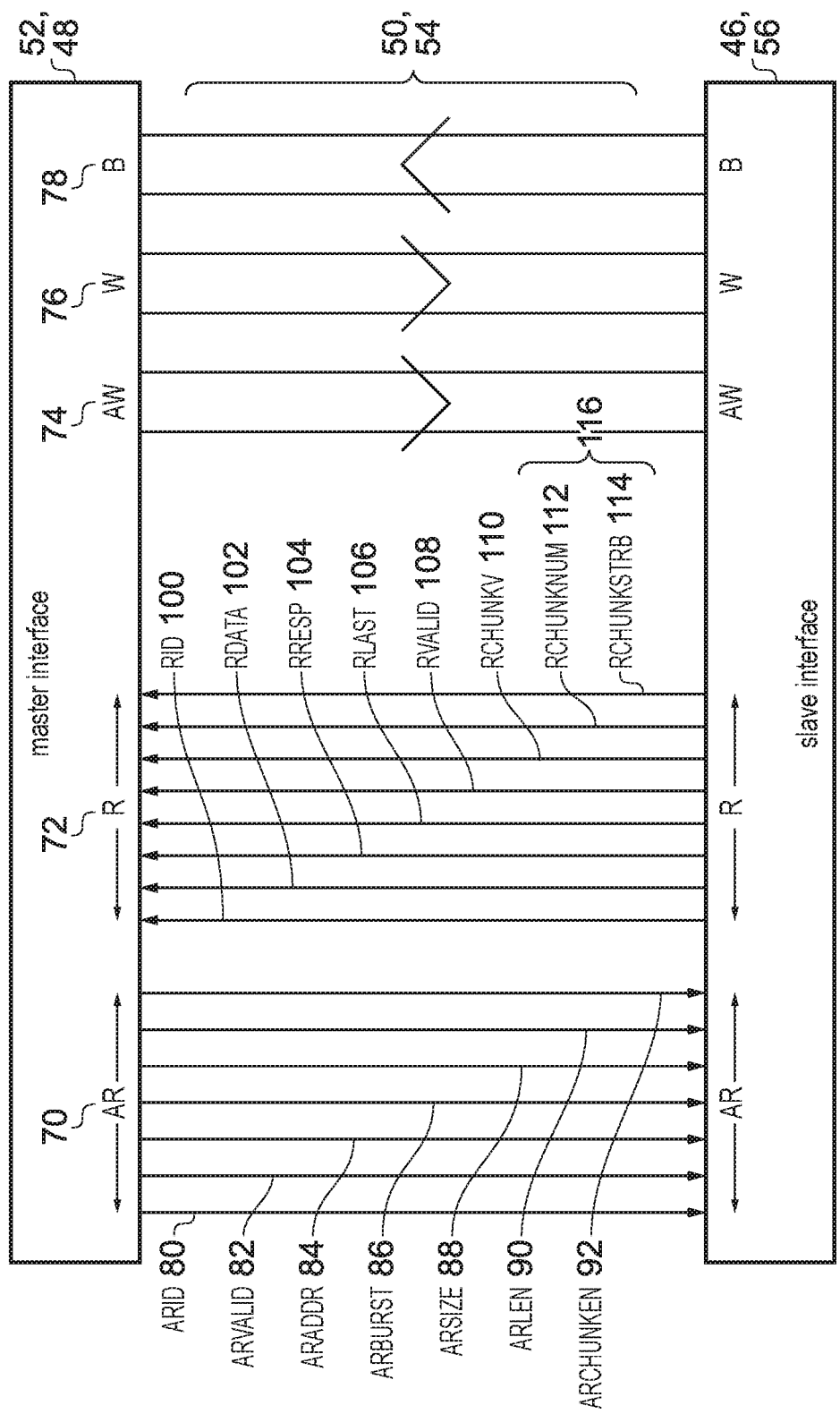
FIG. 3 shows an example of signals exchanged on a communication channel between a requester device and the interconnect or between the interconnect and a completer device.

FIG. 3 illustrates an example of signals transmitted over the communication channel 50, 54 between a master interface 52, 48 and a slave interface 46, 56 according to the bus protocol used on the communication channel 50, 54. The master and slave interfaces shown in FIG. 3 could be either the master and slave interfaces on the requester side which communicate over channel 50 or the master and slave interfaces 48, 56 on the completer side of the interconnect which communicates over channel 54. As shown in FIG. 3, the signal on the communication channels 50, 54 may be divided into a number of subsets (channels), including:

a read address channel (AR) 70 comprising signals sent from the master interface 52, 48 to the slave interface 46, 56, used for issuing of read requests;

a read response channel (R) 72 comprising signals sent from the slave interface 46, 56 to the master interface 52, 48, used to provide read responses transferring data requested in a corresponding read request;

a write address channel (AW) 74, comprising signals sent from the master interface 52, 48 to the slave interface 46, 56, used for issuing write requests to request that data is written to a system location identified by a write target address;

a write data channel (W) 76, comprising signals sent from the master interface 52, 48 to the slave interface 46, 56 providing the write data to be written to memory for a corresponding write request sent on the write address channel 74; and a write response channel (B) 78, comprising signals sent from the slave interface 46, 56 to the master interface 52, 48 in response to a write request, e.g. to acknowledge the write request and confirm that the write request has been, or will be, carried out.

It will be appreciated that in some cases there may also be additional channels on the interface, e.g. snoop request/response channels for exchanging snoop requests and responses for maintaining cache coherency. The signals on the write address channel 74, write data channel 76 and write response channel 78 may be implemented according to any known protocol and will not be discussed further here, as the features in the data chunking techniques discussed here concern read requests handled using the read address channel 70 and read response channel 72.

FIG. 3 shows an example of some of the signals transmitted via the read request channel 70 and read response channel 72 of the communication paths 50, 54. It will be appreciated that this is just a subset of the types of signals which could be transmitted and not all portions of the read request and read response channels 70, 72 are shown in FIG. 3.

The read request channel 70 includes a number of signals including the following:

ARID 80: a read request identifier distinguishing the read request from other read requests;

ARVALID 82: a read request valid signal indicating whether the read request on the read request channel 70 is valid or invalid. In cycles when there is no read request to be issued then the ARVALID signal 82 can be de-asserted to indicate that any signals transmitted on other parts of the read request channel 70 should be ignored.

ARADDR 84: a read address specifying a target address for the read request. The target address identifies an address of a memory system location for which a read operation is to be performed. The read address can specify an address of one data item to be returned in the read response to the read request, or for burst transactions with a burst size greater than 1 can be used to derive the addresses of each of the data items to be returned.

ARBURST 86: a burst type for a burst read transaction issued on the read request channel 70. For example burst read transactions may be defined as one of the following types (each type being allocated a different encoding of the ARBURST value):

Fixed: for a fixed burst, the burst read request requests a read operation to be performed for a number of data items, each of which has the same address, with the address of each data item in the burst being equal to the address indicated on the read address signal 84. This burst type can be useful for repeated accesses to the same location, such as when emptying a FIFO (first in first out) buffer or when reads are performed to trigger an action to be carried out at a peripheral device and that action is to be carried out more than once.

Incrementing: for an incrementing burst the address for the first data item to be read is the address specified in the read address signal 84 and then the address for each subsequent data item corresponds to an incremented address obtained by incrementing the address for the previous data item by an increment size which depends on the size of the data transfer as specified on the burst size signal 88 described below. This burst type could be used for reading a number of data items when accessing normal sequential memory.

Wrap: a wrapping burst may be similar to an incrementing burst, but the address of a subsequent data item may wrap around to a lower address if an upper address limit is reached. When the address on the address signal 84 is not aligned with respect to a wrap boundary (where the wrap boundary is aligned to a size corresponding to the product of the burst size 88 and burst length 90), then the default order in which the requested data items are to be returned will start at the address specified on the address signal 84, continue incrementing up to an upper limit address, and then wrap around to a lower address which corresponds to the wrap boundary, and the continue incrementing up to the address preceding the start address encoded using the address signal 84. The upper limit address corresponds to the sum of the wrap boundary representing the lowest address to be accessed and the total size of the data to be transferred. A wrapping burst can be useful for cache line accesses, where when loading data into a cache for a certain target address 84, the burst also requests access to any other data items in the same cache line (in anticipation that although not yet requested explicitly by processing circuitry those other data items are relatively likely to be needed soon and so can be loaded to reduce cache miss rate for future accesses), but by starting with the data item identified on the address path 84, this means that the actual data item required by the processing circuitry can be obtained with lower latency.

ARSIZE 88: a burst access size which identifies the size of each data item for which the burst request is requested;

ARLEN 90: burst length identifying the number of data items requested in the burst; and ARCHUNKEN 92: a chunking enable signal indicating whether the burst access request is a chunking enabled or chunking disabled burst access request. When chunking is enabled for the burst request then the recipient is permitted to return the corresponding data items to the burst in a different order from the default order defined based on the burst type 86.

The read response channel 72 provides a number of signals from the slave interface 46, 56 to the master interface 52, 48, including at least the following (again, other signals could also be provided if desired);

RID 100: a read response identifier which identifies which read request the current read response relates to. When responding to a read request the recipient may specify in any read responses the same identifier that was received on the ARID channel 80 for the corresponding read request.

RDATA 102: returns the data item requested in the corresponding read request. Different communication channels 50, 54 within the system on chip 2 may have different data widths for the read data signal 102. As described further below, if data chunking is enabled then sometimes the read data channel 102 may not be fully populated with data read from memory and the chunk strobe information 114 described below can be used to signal which portions of the read data signal 102 are valid.

RRESP 104: a read response signal which indicates status information indicating the status of handling the corresponding read response. For example the read response signal 104 may indicate whether the read operation was performed successfully or whether an error occurred at the completer.

RLAST 106: a last data item signal which can be asserted for the final data item returned for a burst read transaction to indicate that this is the final data transfer for that burst read transaction. This can be useful to allow the master to detect when responses providing certain data items have gone missing on the interconnect, for example because of a routing error.

RVALID 108: a read response valid signal indicating whether the information on the read response channel 72 is valid or not. The read response valid indication 108 can be deasserted in cycles where there is no read response available for routing over the communication channel 50, 54.

RCHUNKV 110: chunk information validity indication specifying whether the chunking information 116 described below is valid or not. Completer devices which support read data chunking may assert the chunking valid signal 110 if they have set valid information for the chunking identifying information 116, and otherwise may deassert the chunking valid signal 110 to specify that the chunking information is invalid. Alternatively, for some communication channels 54 involving a completer which does not support chunking, the chunking information valid signal path 110 may be omitted from the physical interface and circuitry at the master interface may be hardwired to indicate that responses from that completer have invalid chunking information.

RCHUNKNUM 112: a chunk number (or chunk ordering identifier) which indicates, for data items returned in responses with valid chunking information, a relative position of the data item within the default order associated with the transaction.

RCHUNKSTRB 114: strobe information, which indicates for responses with valid chunking information, which sub-portions of a requested data item are being returned in the data transfer on the read data signal 102 for the current read request. The chunk strobe information 114 may include a set of enable/disable bits which each correspond to a certain sub-portion of the read data signal path 102 and indicate whether or not that sub-portion provides valid data.

The chunk number 112 and chunk strobe information 114 may collectively be referred to as chunk identifying information 116. Some implementations could omit the chunk strobe information 114 and only support the chunk number 112. For communication channels 54 associated with a completer device 26-36 which does not support data chunking, the chunk identifying information signal paths 116 could be omitted altogether.

Figure 4:
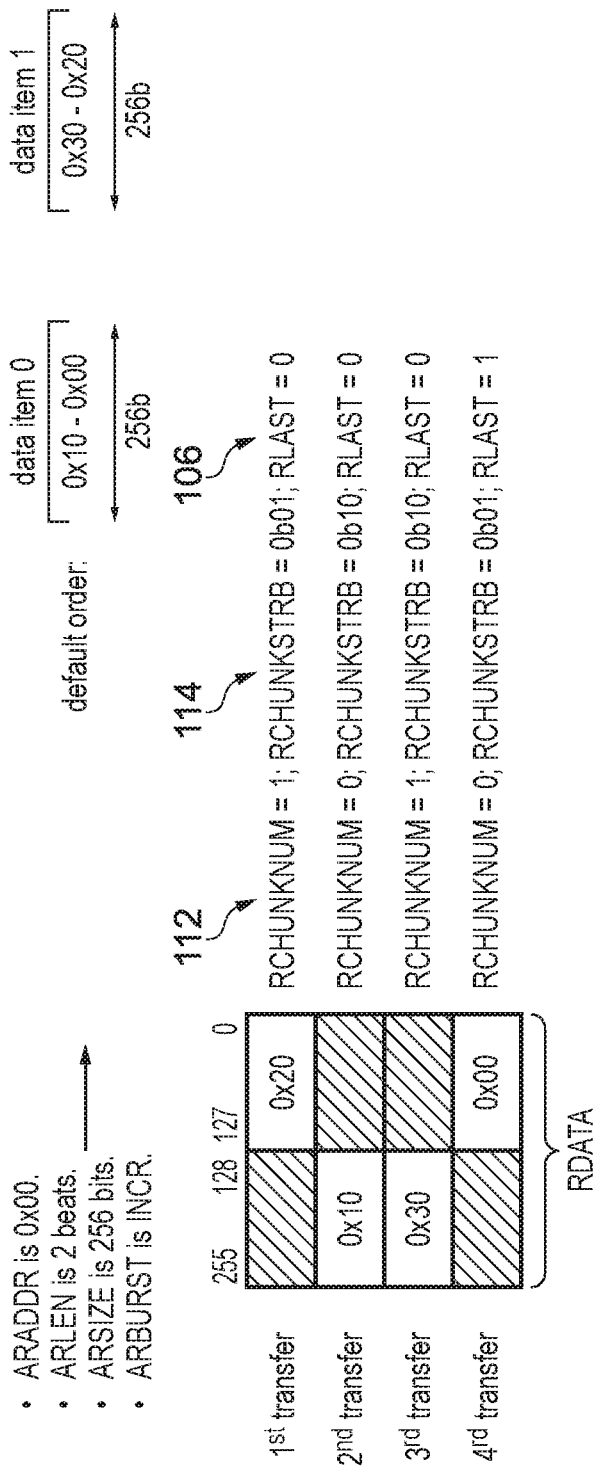
FIGS. 4-6 show examples of data chunking.

Data chunking is explained with respect to the example of FIG. 4. FIG. 4 shows a burst read request for which the target address ARADDR 84 is address 0x00, the burst length ARLEN 90 is 2 beats (data items), the burst size ARSIZE 88 is 256 bits and the burst types ARBURST 86 is an incrementing burst. This means that the burst read request is requesting transfer of two 256-bit wide data items, a first data item comprising the data at addresses 0x00 and 0x10 and a second data item comprising the data at addresses 0x20 and 0x30. The default order for this transaction may require that the first data item returned is the data item starting at address 0x00 and then a second data item starting at address 0x20 is returned.

However, as shown in FIG. 4, the data items requested may not necessarily be returned to the interconnect 6 in the same order as the default order requested by the requester device. This may be because, due to one or more of the targeted completer devices 26-36 using a communication channel 54 with a narrower data width for read data than the channel used on the requester communication channel 50, the read request may need to be mapped to a burst read transaction specifying a smaller burst size which may then lead to a number of smaller data items being returned. Also, it is possible that the requested data may comprise addresses which map onto different completer devices so that the burst read request needs to be split into separate bursts sent to different completers whose responses may end up being received out of order from each other. Also, even within one completer device the addresses may correspond to memory locations which may be accessed with different latencies, for example based on which data addresses have previously been accessed the response latency for some types of memory can vary. Hence, it is possible that the data could be returned to the interconnect 6 out of order and also that data of a width smaller than the requested burst size may be transferred at a given time. If the interconnect had to return data to the requester device 7-22 in the default order, then the interconnect may need to have buffer capacity 118 as shown in FIG. 2, so that it can buffer up the received portions of data items received from various completer devices until the items can be returned in the correct default order to the requester. This buffer storage may be relatively expensive because the interconnect 6 may be handling a large number of requests for different requesters and so the demand on buffer capacity may be high and so if buffer capacity becomes overloaded then this may slow down responses to read requests.

As shown in FIG. 2, some requester devices may have their own internal read data buffers 120 which may provide buffer storage which could be used to reorder portions of data items received from the interconnect 6 if necessary. If the requester device has such buffer space available then it may be more efficient for any reordering to take place at the requester device rather than the interconnect 6, because a given requester device may generally be handling fewer requests than the interconnect 6 and there may be less pressure on buffer capacity among the requests associated with a single requester device than would be the case for all of the requests handled by the interconnect. Also, in practice buffer space may be provided at the requester for other purposes (e.g. for buffering up data returned from the memory system while waiting for the data to be allocated into a cache), so if the requester already has buffer capacity then buffering the data at the interconnect as well is redundant and leads to increased circuit area in provide buffer space sufficient to deal with data chunking at the interconnect.

Hence, depending on whether the requester device has buffer capacity 120 (and associated circuit logic) for reordering data received from the interconnect 6 into the default order, the requester device may use the chunking enabled indication 92 to signal whether a request is a chunking enabled transaction for which it is permitted that the data items are returned in an order other than the default order, or a chunking disabled transaction for which the data items are to be returned in the default order. If chunking is enabled, then the data items may be returned in data transfers to the requester device in any order with the chunking identifying information 116 used to identify which order portions of the requested data items are returned. For example, in FIG. 4 the requested data items are returned in four separate data transfers each providing 128 bits of data with the addresses in the order 0x20, 0x10, 0x30, 0x00, and so when these are returned to the initiating requester over a 256-bit wide read data signal 102 then half of each data transfer is invalid as indicated by the chunk strobe information 114. The chunk number 112 identified for each data transfer on communication channel 50 identifies whether the portion relates to data item 0 or data item 1. The last data item signal (RLAST) 106 is asserted on the final transfer. Hence, these pieces of chunk identifying information enable the requester device to allocate each portion of data received into the correct part of the data buffer 120 so as to assemble the data items in the correct order according to the default order.

To support such data chunking, a completer device which supports data chunking may have a chunk identifying information generator 122 which generates the chunk identifying information 112, 114 for items returned in response to a chunking enabled burst read request.

Figure 5:
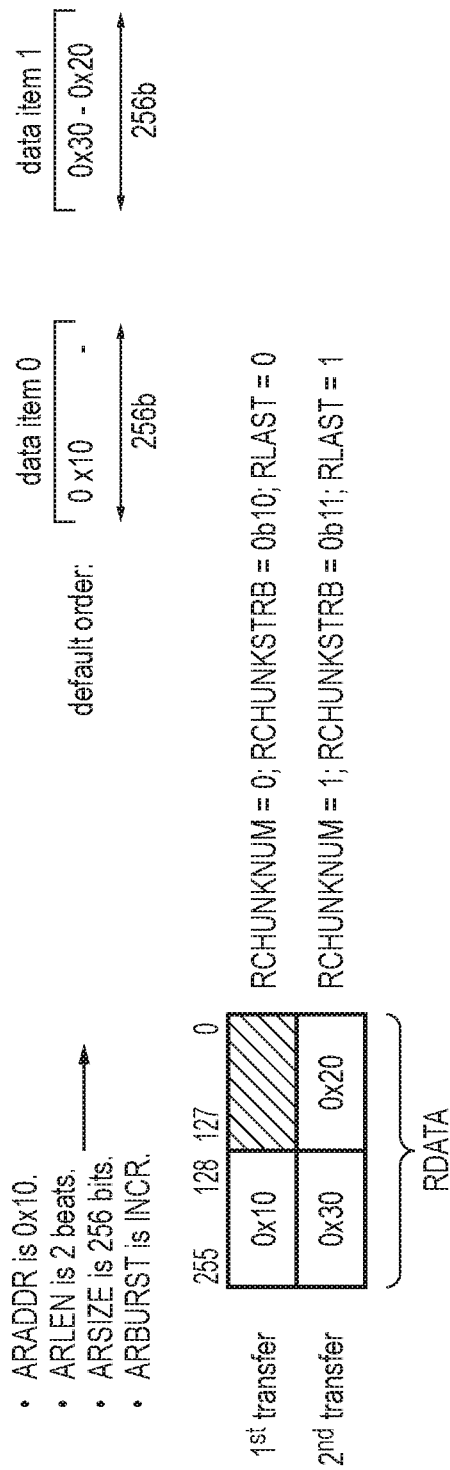

FIG. 5 shows another example of data chunking, this time for a burst read transaction which requests part of two data items each of 256-bits in size, although this time the target address ARADDR is not aligned to the size boundary corresponding to a block of 256-bit data and so this time the first data transfer in the default order is only partially filled and the chunk strobe information can indicate which portions are valid. Hence, in the example of FIG. 5 the responses provide a mixture of 128-bit and 250-bit chunks.

Figure 6:
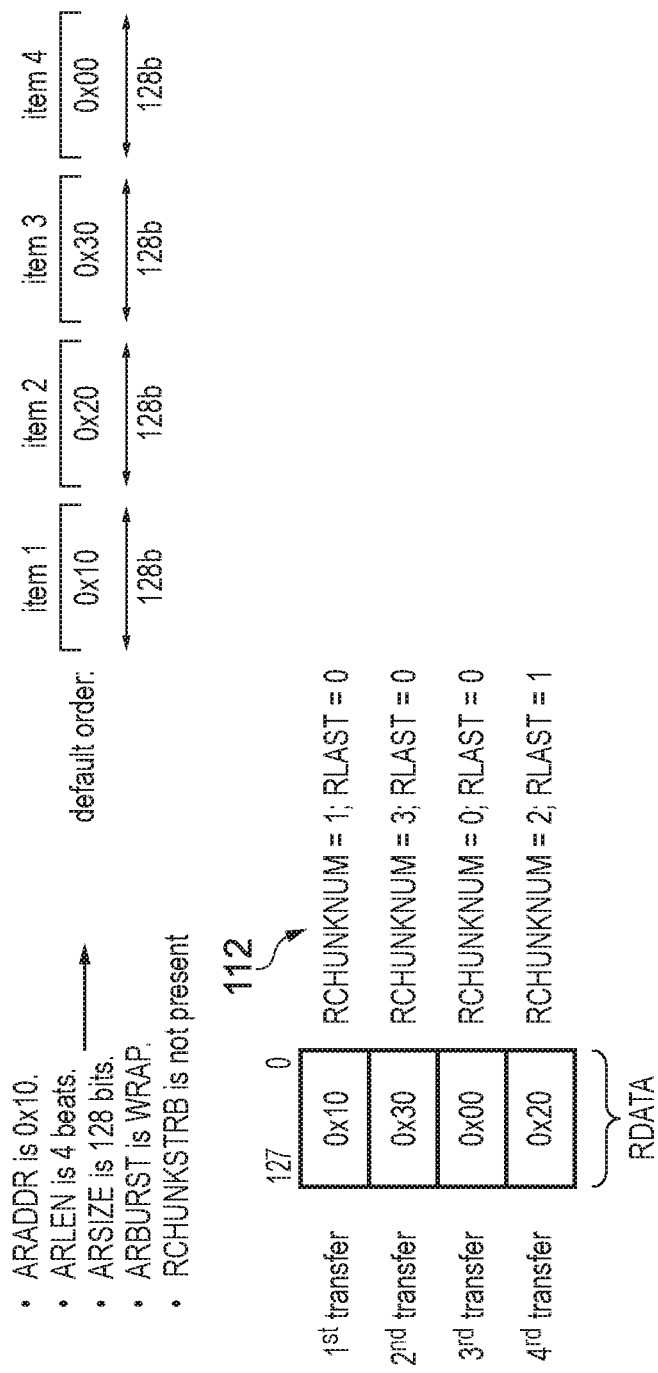

FIG. 6 shows an example applied for a wrapping burst with target address 0x10, burst length ARLEN of 4 beats, burst size ARSIZE of 128 bits and burst type ARBURST of "wrap", where the target address is address 0x10 is not aligned to the 4x128-bit total data size and so the default order prescribes that the data items start at the target address and then increase up to an address boundary after the final byte of item 3 at address 0x30, and then wraps around to a lower address aligned to that total data size boundary, namely address 0x00. For this example, when chunking is enabled the data items may be returned in any order, although the target address may provide a hint as to which data item it is preferred to return first (e.g. the data item from address 0x10 may be the data item which currently needs to be loaded to processing circuitry, while the other data items may be being allocated into a cache in anticipation of being needed in future so it is less critical that these are loaded fastest). For wrapping burst transactions, while the default order may start with the data item at the specified target address which is unaligned to the total data size boundary, the chunk numbers 112 may have values which corresponds to the order of the data items in memory so that chunk number 0 may correspond to the lowest address 0x00 even though this is not the first item to be returned in the default order. This approach where the chunk number 112 are the same regardless of whether the burst is an incrementing burst as shown in FIG. 4 or a wrapping burst as shown in FIG. 6 can simply implementation of the chunk identifying information generator 122 within the completer device and also simplify allocation of the data into a read data buffer 120 at the requester device where the allocation in the buffer may prefer to record the data items in the order corresponding to their position in memory (which may map the order in which the data items could be allocated into a cache).

However, as shown in FIG. 2 not all completer devices 26-36 may have the chunk identifying information generating circuitry 122, and so there may be a subset of completer devices which cannot support data chunking. Such completer devices may be constrained to return the data items in the default data order as they cannot generate the chunk identifying information. In this case those completer devices may themselves have some internal buffers for buffering items of data until they can be returned in the default order. Such non-chunking-supporting completer devices may for example include legacy devices developed for a system which supported an older version of the bus protocol which did not support data chunking.

A burst read request may span addresses which may be mapped onto different completer devices, especially for an interconnect which supports address striping and/or burst splitting. If some of the completer devices targeted by a given burst transaction request received from a requester device support data chunking and others do not then this may make it more complex to handle chunking. One approach for dealing with this could be to provide a lookup at the requester interface 46 of the interconnect 6 to determine whether the respective completer devices for handling a given burst read request can support chunking or not and then to issue chunking enabled or chunking disabled signals depending on the lookup. In the case where any one target completer device cannot support chunking, then this may require the entire burst transaction to be handled as a chunking disabled transaction and in this case then internal buffering 118 within the interconnect 6 or within the completer devices may be needed to handle the reordering needed to deal with ordering the items of data in the correct default order for the burst transaction. This can be disadvantageous because it may only be possible to use chunking for those bursts which target only completer devices which do support chunking.

Therefore, in the technique discussed below, instead of looking up, at the requester interface 46, the chunking capabilities of each completer device, instead chunking identifier reconstruction circuitry 130 is provided within the interconnect 6 to enable reconstruction of the chunk identifying information for read responses which are returned from one of the completer devices 26-36 which does not support data chunking, so that those devices responses can be interleaved with responses from a completer device which does support data chunking and so provides completer-provided chunk identifying information, so that the overall set of read responses returned to the requester device can use the chunk identifying information to allow out of order responses even if the original burst request is split into requests sent to different completer devices only some of which support chunking. This can improve performance by enabling chunking to be used more often and improve utilisation of buffer capacity within the system.

Figure 8:
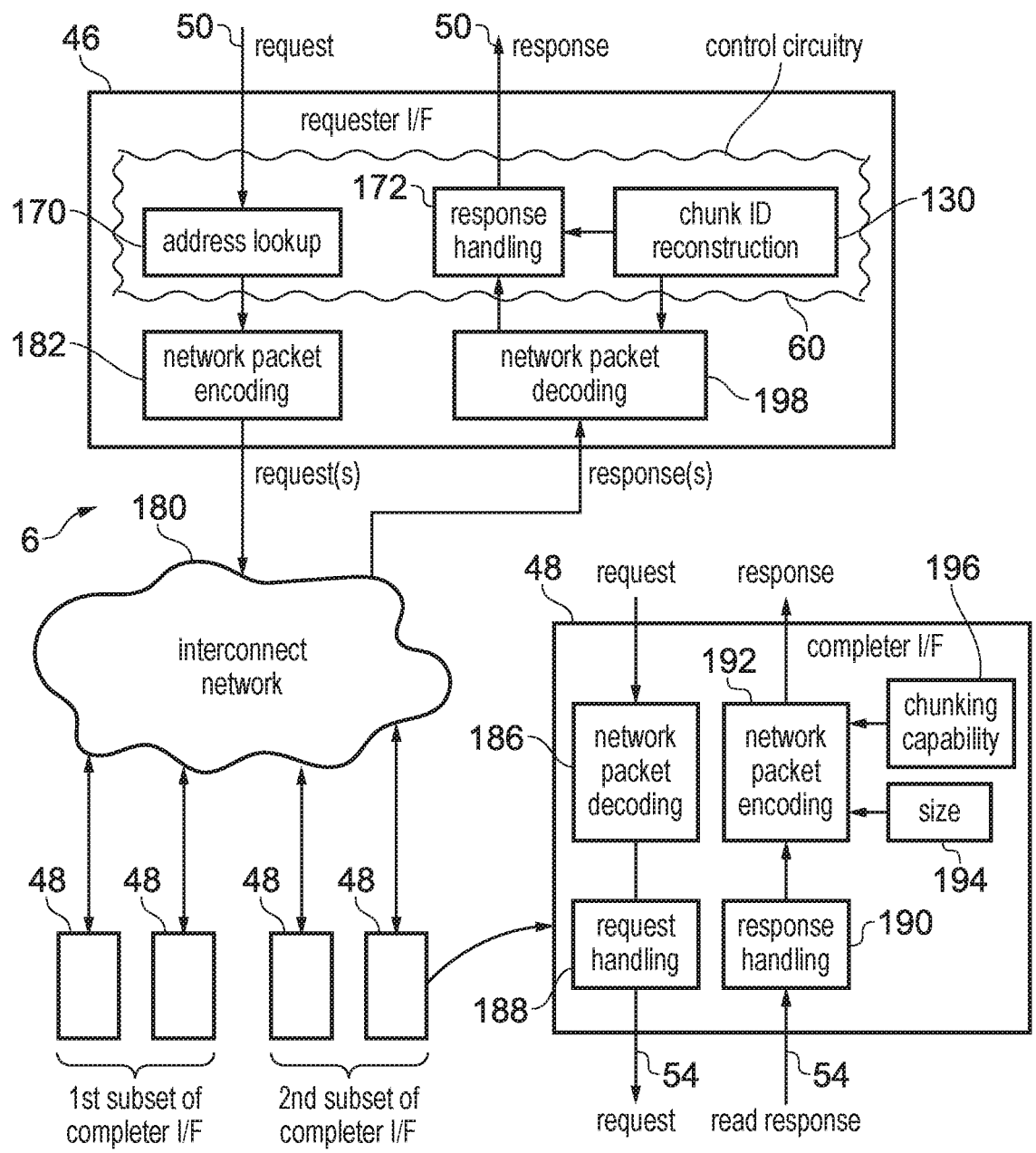
FIG. 8 shows in more detail the control circuitry for reconstructing the chunk identifying information.

While FIG. 2 shows the chunk identifying information reconstruction circuitry 130 as being within the general control circuit logic 60, in practice this reconstruction circuitry could be implemented at various parts of the interconnect, for example within the requester interfaces 46 or within the completer interfaces 48. FIG. 8 discussed below shows a more detailed implementation of this.

Figure 7:
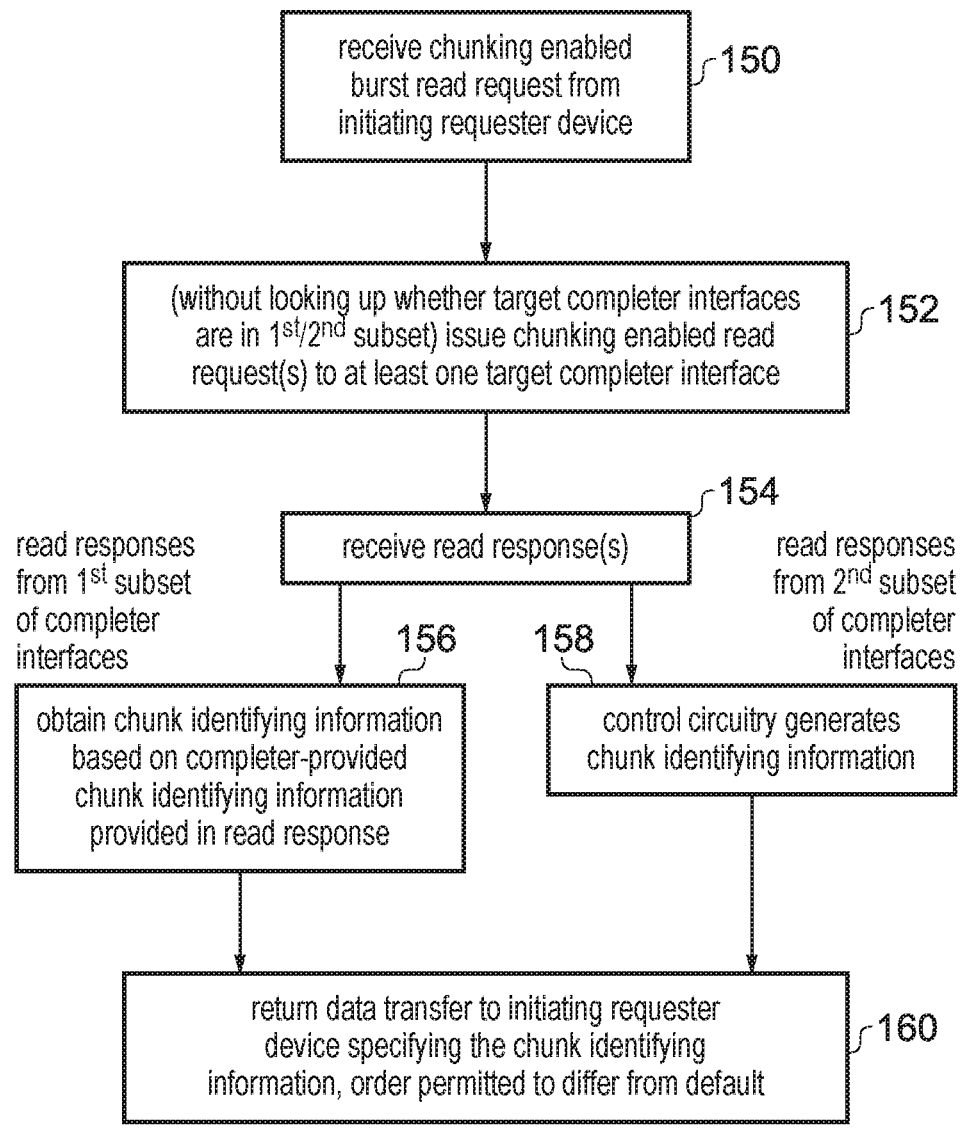
FIG. 7 is a flow diagram showing a method of handling read responses for a burst read request, including generation of chunk identifying information at the interconnect.

FIG. 7 is a flow diagram showing a method of handling a chunking enabled burst read request. At step 150 a chunking enabled burst read request is received at an initiating requester interface 46 from an initiating requester device 7-22. The chunking enabled burst read request is a burst read request for which the burst length 90 is greater than 1 and the chunking enable signal 92 specifies that chunking is enabled.

In response to the chunking enabled burst read request, at step 152, the initiating requester interface 46 looks up address mapping information to determine one or more target completer interfaces 48 for the current burst read request. Without looking up whether those target completer interfaces are in a first subset of completer interfaces which do support chunking or a second subset of completer interfaces which do not support chunking, the initiating requester interface 46 controls issuing of chunking enabled read requests to at least one target completer interface 48. Hence, each of the read requests issued to the one or more target completer interfaces 48 selected for the current burst is issued with the chunk enable signal 92 asserted so that if the corresponding completer devices do support chunking then they may reorder their data transfers in response to the read request if desired. The read requests issued at step 152 could be burst read requests requesting transfer of multiple data items where there are multiple data items required for the same completer interface, or some of these read requests could just be a single read request requesting a single data item (by specifying a burst length 90 of 1) if there is only one of the required data items mapped to that target completer interface for example. By avoiding the need to look up extra information identifying capabilities of a target completer interface regarding chunking, this avoids adding latency to the handling of a read request at the initiating requester interface 46 which can improve performance.

At step 154 read responses are received from the various completer devices in response to the requests issued at step 152. The subsequent steps of FIG. 7 show the steps taken for each response. For a read response received from one of a first subset of completer interfaces which have the chunk identifying information generating circuitry 122, at step 156 the control circuitry 60 obtains chunk identifying information for that read response based on completer-provided chunk identifying information provided in the read response received from the corresponding completer device 26-36. In contrast, for read responses received from one of a second subset of completer interfaces 48, which correspond to a completer device which does not have the chunk identifying generating circuitry 122, at step 158 the chunk identifying information reconstruction circuitry 130 within the control circuitry 60 generates the chunk identifying information for that read response. This is described in more detail in FIG. 9 below. Some completer interfaces may be part of both the first and second subsets, in that while a completer device could provide completer-provided chunk identifying information, there could still be some remapping of that completer-provided chunk identifying information to generate the chunk identifying information to be returned to the requester device, with that remapping being performed by the chunk identifier reconstruction circuitry 130. For example this remapping could be based on any changes of size between the data channels on the communication buses 54, 50 associated with communication with the completer and requester devices respectively, or could be based on interleaving requests from different completers.

Regardless of whether the chunk identifying information is provided by the completer or is remapped or regenerated at the interconnect, at step 160 the interconnect returns the data transfer from the initiating requester interface 46 to the initiating requester device 7-22, with the data transfer specifying the chunk identifying information on the signal paths 112, 114 of the read response channel 72 and the chunk valid signal 110 asserted. The data transfers returned for respective read responses at step 160 may be sent in an order permitted to differ from the default order associated with the burst transaction.

FIG. 8 shows portions of the on-chip interconnect 6 for handling the chunk identifying information reconstruction. FIG. 8 shows one requester interface 46 and one completer interface 48 which is a member of the second subset of completer interfaces corresponding to non-chunking supporting completer devices. As shown at the bottom left of FIG. 8 the completer interfaces also include a first subset of completer interfaces which correspond to completer devices which do support chunking.

FIG. 8 shows components of the requester interface 46 in more detail (it will be appreciated that the requester interface may have many other components not illustrated for conciseness). The control circuitry 60 for controlling routing of requests and chunk identifying information reconstruction comprises address lookup circuitry 170, response handling circuitry 172 and chunk identifier reconstruction circuitry 130. When a read request is received then its address is looked up by the address look up circuitry 170, for example based on mapping information mapping target addresses to target completer interfaces 48. Based on the looked up address, an identifier of the target completer interface (or identifiers of multiple completer interfaces) is generated and requests are generated for each target completer interface and these are then encoded according to the network protocol to be used on the interconnection network 180 within interconnect 6 by network packet encoding circuitry 182. The requests are sent out over the network 180 and processed at the completer interfaces 48 which comprise network packet decoding circuitry 186 to decode the packets, identify the corresponding read request information and then read request handling circuitry 188 within the completer interface 48 generates a request according to the bus protocol used on the transmission channel 54 for communicating with the completer device 26-36.

When a read response is received over the communication channel 54 from a completer device, the corresponding completer interface 48 uses response handling circuitry 190 to interpret the response received from the completer device and control other components of the completer interface 48 to perform their functions. When a response is received then the network packet encoding circuitry 192 encodes a network packet to transfer the received data item received with a read response over the transmission channel 54. The completer interface has a number of internal storage circuits for storing extra information which can be appended to the network packets, for example including a size parameter 194 which indicates the data width of the read data signal 102 on the transmission channel 54 for communicating with the completer device 26-36. Also optionally the appended data for a network packet could also include an indication 196 of whether or not the completer device supports chunking or not. These pieces of information 194, 196 are examples of chunking reconstruction information which can be sent in the network packet which provides the read response to the initiating requester interface 46 to support reconstruction of chunk identifying information. The chunking capability indication 196 is not essential and some examples could only use the size. Similarly other examples could omit the size if all completer transmission channels are of the same width.

Hence, the completer interface sends a network packet (or multiple network packets) over the interconnect network 180, which is received at the initiating requester interface 46 which decodes the packet using network packet decoding circuitry 198. The chunk identifying information reconstruction circuitry 130 uses the size information 194 and/or chunking capability information 196 to determine whether to reconstruct chunking information for the received read response and if so how to generate the chunk identifying information. An example of this will be described with respect to FIG. 9. The reconstructed chunk identifying information is passed to the response handling circuitry 172 which then provides a data transfer transferring the received data extracted from the network packets by the network packet decoding circuitry 198 and the chunk identifying reconstructed by circuitry 130 in a read response sent over the communication channel 50 to the initiating requester device 7-22.

While FIG. 8 shows an example where the chunk identifying information reconstruction occurs at the requester interface 46, it would also be possible for this to be done at the completer interface 48 and in this case there is no need for the reconstruction information 194, 196 to be encoded within the network packet sent across the interconnect network 180, as in the case where the chunk identifying information is reconstructed on the completer interface side then instead the reconstructed chunk identifying information could be encoded in the network packet the same as if the read response had been received from one of the first subset of completer interfaces 48 which do provide the completer-provided chunk identifying information.

Figure 9:
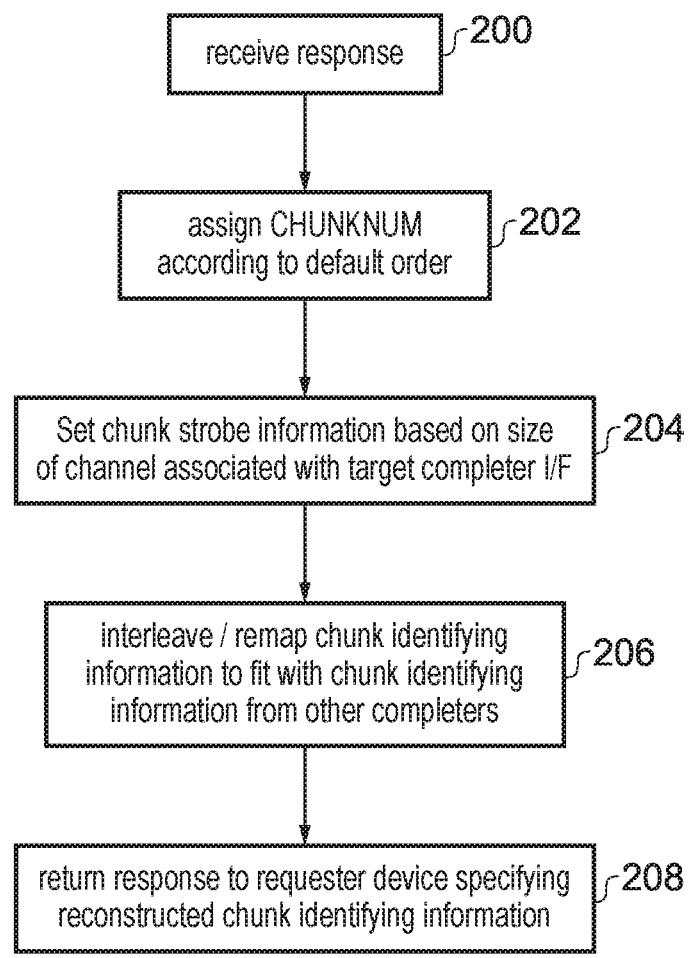
FIG. 9 is a flow diagram showing a method of reconstructing chunk identifying information.

FIG. 9 is a flow diagram showing in more detail the processing at step 158 of FIG. 7 for chunk identifying information reconstruction. At step 200 a read response is received at the part of the control circuitry 60 which comprises the chunk identifying information reconstruction circuitry 130. As mentioned above, this could be either at the requester interface or the completer interface, or in an intermediate network component within the interconnect.

At step 202 the chunk identifying information reconstruction circuitry 130 assigns the chunk number 114 to the read response according to the default order associated with the burst transaction. For completers which do not support chunking then they will return the data items in the default order, so that the interconnect can simply maintain a counter which is incremented each time a read response is received and use this to assign different chunk numbers 114 to reach data transfer in the order according to the default order. As mentioned above, for wrapping bursts the lowest address received may have the lowest value of the chunk identifying information, so it may be that the counter is initialised to have a value other than zero (selected based on the read address 84 of the corresponding read request), so that the chunk numbers 114 can be allocated as shown in the example of FIG. 6.

At step 204 the reconstruction circuitry 130 sets the chunk strobe information 112 based on the size of the read data channel 102 of the communication path 54 used to communicate with the completer device from which the read response was received. Hence, in cases where the received data is narrower than the width of the read data path 102 on the communication channel 50 over which the data will be sent to the initiating requester device, the strobe information can be set to indicate which portions of that read data path 102 will be valid. This is why is it useful to know the size associated with the communication channel for the target completer interface, which can be embedded within storage 194 within the completer interface at the time of configuring the interface design, as will be discussed further below.

At step 206, depending on whether the read response is one of several read responses received from a number of different completer interfaces, and/or on whether the channels 50, 54 have different widths of read data paths 102 the reconstruction circuitry 130 may also interleave or remap chunk identifying information to fit with chunk identifying information from other completers and/or to ensure there is a consistent sequence of chunk identifying information in the data transfers returned to the requester. If the currently processed read response is received form the only completer involved in the current burst transaction and there is no change in channel read data size then step 206 could be omitted. Step 206 could for example involve adding an additional offset to the chunk number assigned at step 202 depending on the position of the burst being handled by one completer relative to bursts handled by another completer in cases where burst splitting is implemented. An example of this will be shown in FIG. 10 below. Also, if the requester uses a different size read data path than the completer, then chunk numbers 114 received from the completer could be remapped by multiplying or dividing them by a value depending on the size ratio between the read data paths 102 on the requester/completer transmission channels 50, 54, with that size ratio determined based on the size information obtained at the completer interface 48.

At step 208 a data transfer is carried out by returning a read response to the initiating requester device, where the read response specifies the returned data item or portion of a data item received at step 200 and the reconstructed chunk identifying information generated at steps 202-206.

Hence, this approach has several advantages. Firstly, as it is possible to reconstruct chunk identifying information for read responses received from a completer which does not support data chunking, then data chunking can be used even if not all the completers can support chunking, to make better use of any limited buffer capacity within the interconnect. Also, this approach avoids the need to look up capabilities of individual completers at the initiating requester interface when handling the request, where there may already be a relatively long critical path through the address look up 170 and any other functions for enforcing memory ordering requirements or other aspects of processing requests.

FIG. 10 shows a worked example of the reconstruction of the chunk identifying information. In this example the burst read request received from the initiating requester specifies target address ARADDR 0x00, a burst length 90 of four data items (beats), a burst size 88 of 256 bits and a burst type 86 of an incrementing burst. In this example, the addresses covered by the burst are striped across two different completer devices, completer 0 which is one of the first subset supporting chunking and completer 1 which is one of the second subset which does not support chunking. The burst is split at 64 byte granularity, so that it is split into two transactions, a first burst transaction starting at address 0x00 which requests the first two beats of 256-bit data items from completer 0, and a second burst requesting two beats of 256-bit data items starting at address 0x40 sent to completer 1. Completer 0 supports chunking and in this example the data transfers are returned in exactly the same order as was discussed earlier for FIG. 4 and so the chunking information 112, 114 and last item signal 116 are the same as in FIG. 4.

Completer 1 does not support chunking and so it returns two data transfers, a first returning the 256-bit data for addresses 0x40 and 0x50 and a second transfer for addresses 0x60 and 0x70. As completer 1 does not support chunking then the chunk identifying information is invalid for this data returned over transmission channel 54 from completer 1.

The third table in FIG. 10 shows the chunk identifying information which can be reconstructed by circuitry 130 within the interconnect 6 for the responses received from completer 1. The chunk number 112 is assigned according to the default order, starting at 0 and incrementing to 1 for the second data transfer. Also, the chunk strobe information 114 is reconstructed in this example to be fully populated with active bits indicating that all portions of the returned 256-bit data are active. If the completer 1 had communicated with the interconnect over a narrower interface (e.g. 128-bits wide) then the chunk strobe information for 256-bit channel on transmission path 50 to the requester would have been set instead to indicate which portions of the 256-bit signal path are valid and filled with the 128-bit data from the narrower interface with the completer.

Hence, the third table in FIG. 10 shows how the chunk number and chunk strobe can be allocated. However, as completer 0 also uses chunk number 0 and 1 then simply allocating chunk numbers starting from 0 at the interconnect for the responses from completer 1 may not be sufficient. Hence, as shown at the bottom of FIG. 10 once these are combined with the responses from completer 0, the chunk numbers for the responses from completer 1 can be remapped to chunk numbers 2 and 3 by adding an offset which may be based on the number of beats of the original 4-beat burst request which have been allocated to the completer 0 which has the lower chunk numbers. That is, the offset may correspond to the burst splitting point at which the bursts were separated. While FIG. 10 shows an example where chunk numbers are first allocated to the read responses from the completer starting at 0 and then later adjusted by adding the offset based on the burst split point, another approach could be that the correctly offset chunk numbers are assigned all along without temporarily allocating other chunk numbers first as in the example of FIG. 10. Also, in some cases if there was resizing of the data path between the completer and the requester then the chunk numbers 114 may also be adjusted by multiplying or dividing the chunk numbers from the completer by a value depending on the ratio of the sizes of the read data width on the completer and requester channels 54, 50.

Hence, once the chunk numbers have been calculated and the chunk strobe information 114 generated based on size information 194 obtained at the target completer interface 48, the read responses can be provided back to the initiating requesting device in any order and the initiating requester can then use its internal buffer 120 to reorder the received data into the correct positions based on the chunk number 112 and chunk strobe 114.

As shown at the bottom of FIG. 10, another modification to the read response channel signal 72 made by reconstruction circuitry 130 can be to suppress the last transfer indication (RLAST) 116 for the last transfer sent from one of the completers when there will still be a remaining transfer to be received from another of the completers. This is shown in the right hand cell in the second last row of the table at the bottom of FIG. 10.

Figure 11:
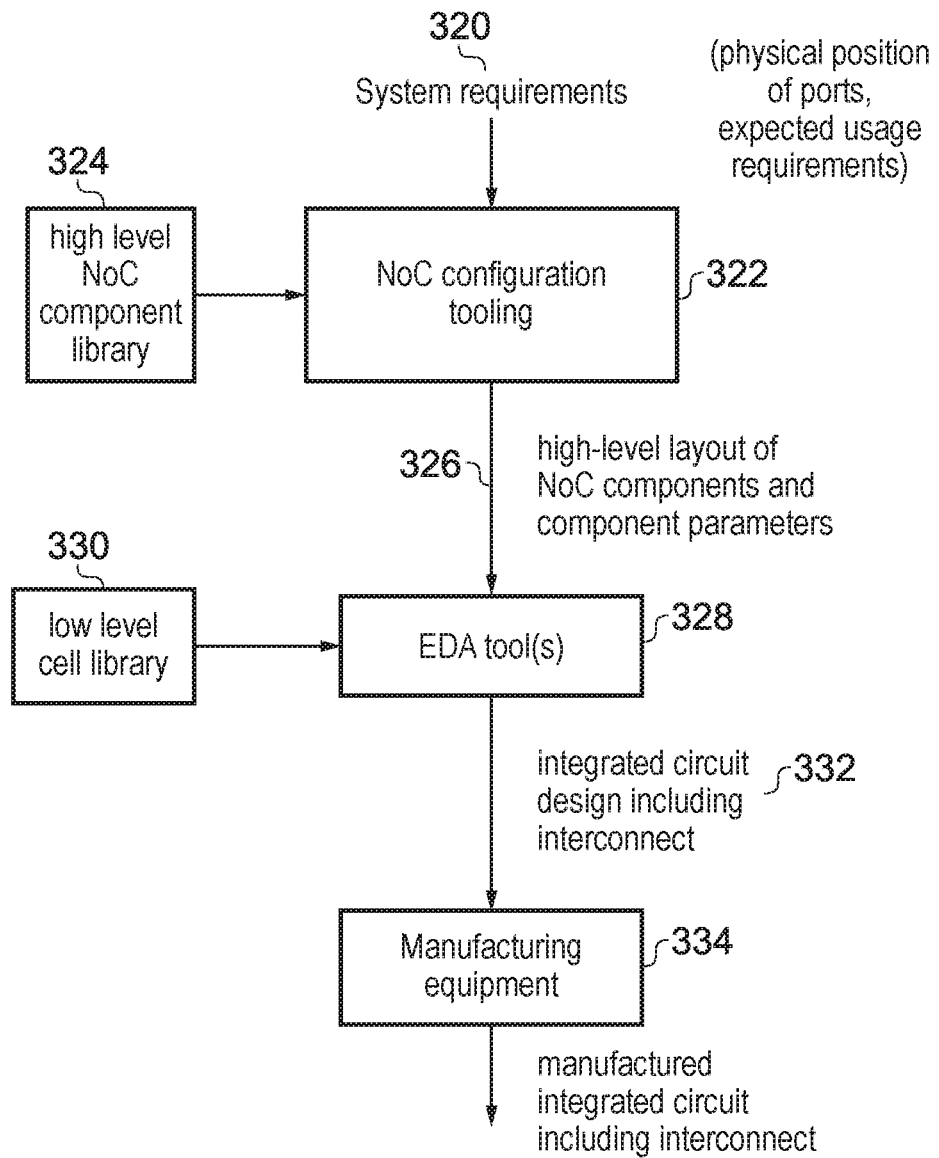
FIG. 11 schematically illustrates design and manufacture of an integrated circuit including an interconnect.

FIG. 11 schematically illustrates an example of an electronic design process which may use automated design techniques to simplify the design process for designing an integrated circuit or system on chip 2. A system designer or an electronic design tool performing an earlier stage of the design process may specify various system requirements 320, such as the physical position of the ports (interfaces) 46, 48 to be used for the on-chip interconnect 6, and/or expected usage requirements (e.g. which pairs of ports 46, 48 are likely to require communication links between them and the expected level of bandwidth for different pairs of ports depending on expected data traffic or prioritisation of different requesters relative to each other). A NoC configuration tooling program 322 executed on a data processing apparatus may use the system requirements, together with a component library 324 providing a high level representation of the various NoC components which can be selected for assembling the NoC, to generate an electronic design file 326 which provides a high level layout of the NoC components and specifies various parameters of those components such as parameters for configuring the particular properties of the components.

For example, the component library 324 could specify a range of components, such as the requester interface 46, completer interface 48, routers 44, or data resizers 70 as discussed above. For some of these types of component, multiple alternative types could be specified in the component library for selection depending on the particular needs of the system requirements 320. Alternatively a single type of component could be provided but the NoC configuration tooling 322 may specify, as properties of a given component, certain variables which may tune behaviour of a given component of the NoC or control how that component is manufactured. For example, the parameters for a requester interface 46 could specify the size of the interface with the corresponding requester device, a subset of completer interfaces 48 for which routing of network traffic is expected to be needed, a packet format to be used for packets routed to particular destinations, etc. The NoC configuration tooling 322 may determine such requirements based on the system requirements that were input. Hence, if some of the completer devices are not expected to support data chunking, a type of requester/completer interface 44, 46 (or other component implementing the control circuitry 60) may be selected which supports chunking information reconstruction as described above.

The high level layout file 326 generated by the NoC configuration tooling 322 is provided to an electronic design automation (EDA) tool 328 which uses a low level cell library 330 specifying standard cells of integrated circuit components at a more detailed level than the NoC component library 324, and generates an integrated circuit design file 332 which specifies the particular gates or transistors to be generated for the integrated circuit which includes the interconnect designed by the NoC configuration tooling 322. In some cases the EDA tool 328 may actually comprise a number of tools which gradually iterate the design to produce more and more detailed circuit-level representations. The EDA tools 328 may also carry out timing analysis to check whether the designed circuit would meet its timing requirements (testing for setup and hold violations for example), and may iterate the design if earlier attempts fail the timing analysis. The eventually prepared integrated circuit design represented by the design file 332 is the provided to a manufacturer who uses the design file to control manufacturing equipment 334 to manufacture the integrated circuit with the required connections between transistors in order to implement an integrated circuit including the interconnect.

Figure 12:
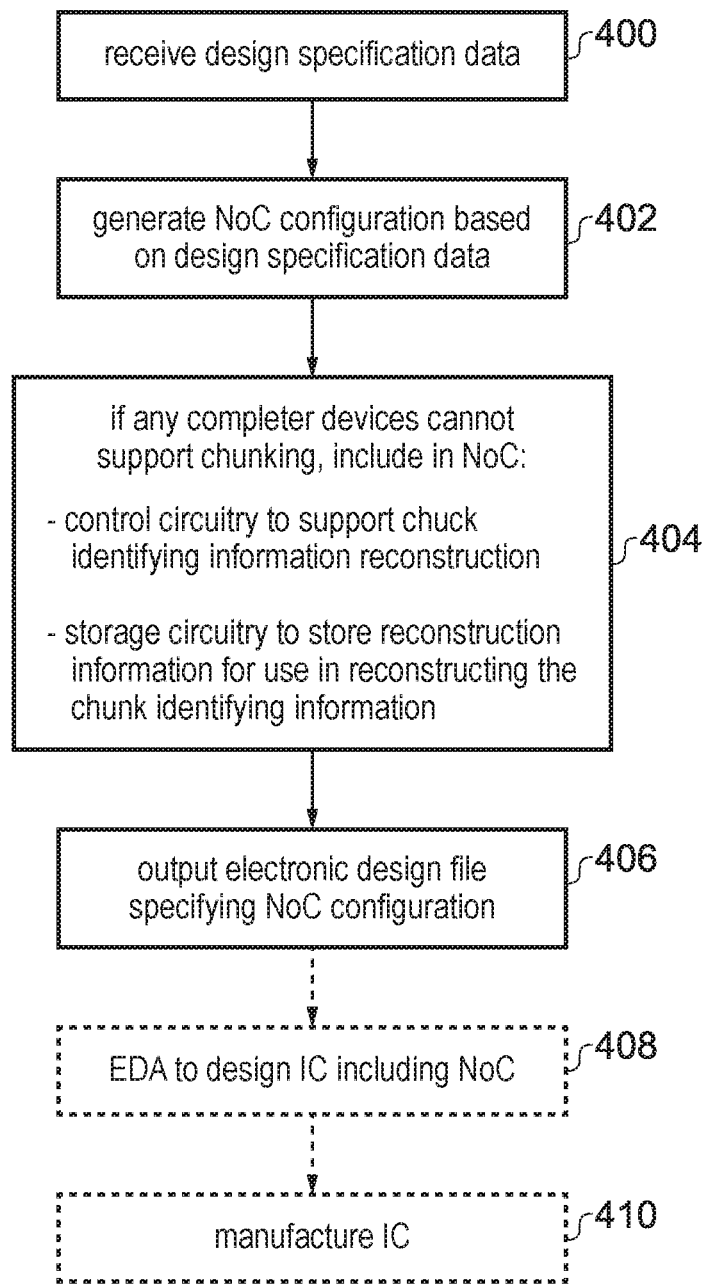
FIG. 12 is a flow diagram illustrating a method of generating an electronic design file representing a design of an on-chip interconnect.

FIG. 12 is a flow diagram showing a method of generating an electronic design file representing configuration of the network on chip 6 which may include support for chunk identifying information reconstruction. At step 400 the design specification data 320 is received which represents properties of the interconnect to be generated. For example the design specification data may specify the number of nodes to be connected using the network (e.g. number of requester and completer devices), the data width of the respective channels 50, 54 used for conveying data to those nodes, and expected usage requirements such as levels of service or bandwidth required for a particular combinations of requester and completer device. The design specification data could also specify which completer devices will support data chunking. In response to the design specification data at step 402 the system tooling 322 generates the high level layout for the network within the interconnect 6, e.g. including an arrangement of routers 44, data resizers or other components of the network, as well as the provided requester and completer interfaces 46, 48. The network configuration may be generated with the layout represented at a relatively high level which may specify the components to be generated at a relatively abstract level, for example merely specifying identifiers of the cell type to be provided and optionally one or more configuration parameters for adjusting properties of that component, but not necessarily specifying the exact transistor level layout for each component.

At step 404, as part of generating the configuration of the interconnect, if any completer devices cannot support data chunking, then the high level layout is generated to specify that the interconnect should include control circuitry 60 which supports chunk identifying information reconstruction as discussed above, and storage circuitry provided at the relevant completer endpoints 48 which store reconstruction information for use in reconstructing the chunk identifying information. For example this reconstruction information could identify the size 194 of the read data path on the corresponding communication channel 54 to the non-chunking supporting completer, and/or capability information 196 indicating whether chunking is supported for the corresponding completer device. The representation of the storage for the reconstruction information could, at the point of generating the high level layout, simply be represented by a parameter identifying the information to be stored, but the detailed transistor level layout for implementing that storage circuitry need not yet to be defined. The provision of the control circuitry supporting chunk identifying information reconstruction could be done for example by identifying that a certain requester endpoint 46 or completer endpoint 48 should include the reconstruction circuitry 130, as opposed to an alternative version of the endpoint 46, 48 which did not have the reconstruction circuitry 130.

At step 406 the design file identifying the high level layout of the interconnect is output in electronic form. Optionally, this electronic design file may then at step 408 be supplied to an EDA tool 328 which uses a standard cell library 330 to provide the specific gate-level design for each of the high level components indicated by the system tooling 322 in the design file 328, to generate a representation of the specific integrated circuit design 2 which can then be manufactured at step 410. At the EDA stage the EDA tool 328 may also provide more detailed gate-level designs for the requester and completer devices themselves, not just the interconnect. Alternatively, the electronic design file representing the interconnect may be output at step 408 and stored to a recording medium, for supply to the EDA tool 328 at a later stage, so the EDA and manufacture stages 408, 410 are not essential.

Hence, while the techniques of reconstructing chunk identifying information discussed above can be implemented in a physical interconnect which represents an actual component included in an integrated circuit, the technique could also be embodied within a non-transitory storage medium which stores an electronic design file representing a design of the interconnect. The design file could for example specify the components to be included in the interconnect such as the requester and completer interfaces and other network components such as routers. Using electronic design files to control the automated manufacture of integrated circuits can be useful because the number of transistors or gates in an integrated circuit in modern systems is so vast that a human designer is unlikely to be able to keep track of the design. Also, use of electronic design files at the higher level abstraction can be useful because this means the human designer can simply focus on the general design of the network on chip without needing to consider individual gate level representation. The automatic computer-implemented generation of a network on chip configuration 326 to comply with certain design requirements represented by the design specification data 320 can also be useful to allow configurable network on chips to be generated more efficiently without needing detailed expert knowledge by the user of how to develop a suitable network configuration to provide any required bandwidth/quality of service guarantees. The technique of reconstructing chunking information is particularly useful for such a configurable network on chip where there may be a wide range of capabilities of different completer end points and so the likelihood that a burst read is split across completers with different properties is higher.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An on-chip interconnect comprising:
at least one requester interface to communicate with at least one requester device;
a plurality of completer interfaces to communicate with a plurality of completer devices; and
control circuitry responsive to a burst read request received at an initiating requester interface from an initiating requester device requesting transfer of a plurality of data items, to control issuing of at least one read request to at least one target completer device via at least one target completer interface; in which:
for a chunking enabled burst read transaction indicating that the initiating requester device permits the plurality of data items to be returned to the initiating requester device in a different order to a default order associated with the burst read transaction, the control circuitry is configured to support returning the plurality of data items to the initiating requester device in a plurality of data transfers, with an order of the data items in the plurality of data transfers permitted to differ from the default order and each of the plurality of data transfers specifying chunk identifying information identifying which portion of the plurality of data items is represented by returned data returned in that data transfer; and
for a given data transfer returned to the initiating requester device, for which the returned data is received in a given read response received from a given target completer interface in response to one of the at least one read request:
when the given target completer interface is one of a first subset of completer interfaces, the control circuitry is configured to obtain the chunk identifying information specified by the given data transfer based on completer-provided chunk identifying information provided in the given read response from the given target completer interface; and
when the given target completer interface is one of a second subset of completer interfaces, the control circuitry is configured to generate the chunk identifying information to be specified by the given data transfer.

2. The on-chip interconnect according to claim 1, in which the control circuitry is configured to determine whether the given target completer interface is one of the first subset or the second subset based on information obtained at the given target completer interface.

3. The on-chip interconnect according to claim 2, in which the information obtained at the given target completer interface comprises at least one of:
chunk identifying information validity information indicating whether valid completer-provided chunk identifying information is provided in the given read response;
chunking capability information indicating whether the given target completer interface or a completer device corresponding to the given target completer interface is capable of providing completer-provided chunk identifying information; and
size information indicating a channel data size associated with the given target completer interface.

4. The on-chip interconnect according to claim 1, in which the chunk identifying information comprises a chunk ordering identifier indicating a position of a data item represented by the returned data relative to the default order of the plurality of data items.

5. The on-chip interconnect according to claim 4, in which the chunk identifying information also comprises strobe information indicating which sub-portions of the data item are represented by the returned data.

6. The on-chip interconnect according to claim 1, in which when the given target completer interface is one of the second subset of completer interfaces, the control circuitry is configured to generate the chunk identifying information based on size information indicating a channel data size associated with the given target completer interface.

7. The on-chip interconnect according to claim 1, in which when a plurality of read responses are received from the given target completer interface in response to the at least one read request, the given target completer interface is one of the second subset of completer interfaces and the plurality of read responses do not specify valid completer-provided chunk identifying information, the control circuitry is configured to generate the chunk identifying information for the data transfers associated with the plurality of read responses to indicate that the data items are provided in the default order.

8. The on-chip interconnect according to claim 1, in which the chunk identifying information comprises strobe information indicating which sub-portions of the data item are represented by the returned data; and
   when a channel data size for a communication channel associated with the given target completer interface is different from a channel data size for a communication channel associated with the initiating requester interface, the control circuitry is configured to generate the strobe information based on size information obtained at the given target completer interface, the size information indicating a channel data size associated with the given target completer interface.

9. The on-chip interconnect according to claim 1, in which when the given target completer interface is one of the second subset of completer interfaces and the given read response specifies valid completer-provided chunk identifying information, the control circuitry is configured to remap the valid completer-provided chunk identifying information based on size information indicating a channel data size associated with the given target completer interface, to generate the chunk identifying information for a corresponding data transfer.

10. The on-chip interconnect according to claim 1, in which in response to the burst read request, the control circuitry is configured to control the at least one read request to be issued via the at least one target completer interface, with each of said at least one read request comprising a chunking enabled read request indicating that the data items are permitted to be returned in a different order to the default order, regardless of whether the at least one read request is issued to a target completer interface in the first subset or a target completer interface in the second subset.

11. The on-chip interconnect according to claim 10, in which the control circuitry is configured to control issuing of the at least one read request without looking up whether the at least one target completer interface is in the first subset or the second subset.

12. The on-chip interconnect according to claim 1, in which the control circuitry is configured to support providing the data transfers specifying the chunk identifying information to the initiating requester interface, for a chunking enabled burst read transaction for which a plurality of read requests are to be sent to a plurality of different target completer interfaces including at least one target completer interface capable of providing completer-provided chunk identifying information and at least one target completer interface for which provision of completer-provided chunk identifying information is disabled or unsupported.

13. The on-chip interconnect according to claim 1, in which the control circuitry is configured to support providing the data transfers specifying the chunk identifying information to the initiating requester interface, for a chunking enabled burst read transaction for which a plurality of read requests are to be sent to a plurality of different target completer interfaces including target completer interfaces associated with different channel data sizes.

14. The on-chip interconnect according to claim 1, in which in response to the burst read request, the control circuitry is configured to support splitting of the burst read request into a plurality of burst read requests issued via the at least one target completer interface, each of the plurality of burst read requests requesting transfer of a subset of the data items requested by the burst read request received at the initiating requester interface.

15. The on-chip interconnect according to claim 1, in which the control circuitry is configured to support address striping, to map a physical address of a read request received from the initiating requester interface to one of the completer interfaces based on an address mapping in which, for at least a portion of a memory address space, segments of physical addresses are mapped alternately to the respective completer interfaces so that a given completer interface is mapped to a number of discontiguous segments of physical addresses.

16. An integrated circuit comprising:
   the on-chip interconnect according to claim 1;
   the at least one requester device; and
   the plurality of completer devices.

17. A non-transitory storage medium storing an electronic design file representing a design of an on-chip interconnect according to claim 1.

18. A computer-implemented method of generating an electronic design file representing a design of an on-chip interconnect for providing data transfer between devices of an integrated circuit; the method comprising:
   in response to design specification data identifying properties of the devices to be connected by the on-chip interconnect, generating the electronic design file specifying that the on-chip interconnect comprises:
      at least one requester interface to communicate with at least one requester device;
      a plurality of completer interfaces to communicate with a plurality of completer devices; and
      control circuitry responsive to a burst read request received at an initiating requester interface from an initiating requester device requesting transfer of a plurality of data items, to control issuing of at least one read request to at least one target completer device via at least one target completer interface; in which:
      for a chunking enabled burst read transaction indicating that the initiating requester device permits the plurality of data items to be returned to the initiating requester device in a different order to a default order associated with the burst read transaction, the control circuitry is configured to support returning the plurality of data items to the initiating requester device in a plurality of data transfers, with an order of the data items in the plurality of data transfers permitted to differ from the default order and each of the plurality of data transfers specifying chunk identifying information identifying which portion of the plurality of data items is represented by returned data returned in that data transfer; and
      for a given data transfer returned to the initiating requester device, for which the returned data is received in a given read response received from a given target completer interface in response to one of the at least one read request:
- when the given target completer interface is one of a first subset of completer interfaces, the control circuitry is configured to obtain the chunk identifying information specified by the given data transfer based on completer-provided chunk identifying information provided in the given read response from the given target completer interface; and
- when the given target completer interface is one of a second subset of completer interfaces, the control circuitry is configured to generate the chunk identifying information to be specified by the given data transfer.

19. The method of claim 18, comprising defining, in the electronic design file, information specifying that the on-chip interconnect comprises storage circuitry to store reconstruction information to be obtained for a read response received at the second subset of completer interfaces for use by the control circuitry in generating the chunk identifying information when the given target completer interface is one of the second subset of completer interfaces.

20. A non-transitory storage medium storing a computer program for controlling a data processing apparatus to perform the method of claim 18.

* * * * *